United States Patent
Tollyat et al.

(10) Patent No.: US 9,543,853 B2
(45) Date of Patent: Jan. 10, 2017

(54) SPARSE AND ULTRA-SPARSE PARTIAL RESONANT CONVERTERS

(71) Applicant: THE TEXAS A&M UNIVERSITY SYSTEM, College Station, TX (US)

(72) Inventors: Hamid A. Tollyat, College Station, TX (US); Mahshid Amirabadi, Chicago, IL (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 14/296,010

(22) Filed: Jun. 4, 2014

(65) Prior Publication Data

US 2014/0286059 A1 Sep. 25, 2014

Related U.S. Application Data

(63) Continuation-in-part of application No. 13/486,627, filed on Jun. 1, 2012, now Pat. No. 8,988,900.

(60) Provisional application No. 61/831,446, filed on Jun. 5, 2013, provisional application No. 61/493,210, filed on Jun. 3, 2011.

(51) Int. Cl.
*H02M 3/335* (2006.01)
*H02M 5/458* (2006.01)

(52) U.S. Cl.
CPC ............ *H02M 5/4585* (2013.01); *Y02B 70/145* (2013.01)

(58) Field of Classification Search
CPC .. H02M 5/1585; H02M 3/1582; H02M 5/271; H02M 7/05; H02M 5/4585; Y02B 70/145

USPC ............... 363/13, 16–20, 34, 37, 39, 41, 50, 55,363/56.01, 123, 124, 127, 132; 323/222, 224, 323/226, 239

See application file for complete search history.

(56) References Cited

U.S. PATENT DOCUMENTS

| | | |
|---|---|---|
| 4,096,557 A | 6/1978 | Schwarz |
| 4,523,269 A | 6/1985 | Baker et al. |
| 4,638,138 A | 1/1987 | Rosa et al. |
| 4,730,242 A | 3/1988 | Divan |
| 4,833,584 A | 5/1989 | Divan |
| 4,897,775 A | 1/1990 | Klaassens |

(Continued)

OTHER PUBLICATIONS

Amirabadi, et al. "Battery-Utility Interface using Soft Switched AC Link Buck Boost Converter" 2009, IEEE, pp. 1299-1304.

(Continued)

*Primary Examiner* — Rajnikant Patel
(74) *Attorney, Agent, or Firm* — Conley Rose, P.C.

(57) ABSTRACT

The AC portion of the input of the ultra-sparse partial resonant power converter contains three pairs of forward-conducting-bidirectional-blocking switches connected in a first direction, and two pairs of forward-conducting-forward-blocking devices connected in a second direction to the three pairs of forward-conducting-bidirectional-blocking switches. The second direction is opposite to the first direction. The AC portion of the output of the ultra-sparse partial resonant power converter contains three pairs of forward-conducting-bidirectional-blocking switches connected in a first direction, and two pairs of forward-conducting-reverse-blocking devices connected in a second direction to the three pairs of forward-conducting-bidirectional-blocking switches. The forward-conducting-reverse-blocking devices can be switches or diodes.

43 Claims, 27 Drawing Sheets

(56) References Cited

U.S. PATENT DOCUMENTS

| | | | |
|---|---|---|---|
| 4,942,511 A | 7/1990 | Lipo et al. | |
| 5,010,471 A | 4/1991 | Klaassens et al. | |
| 5,270,914 A * | 12/1993 | Lauw | H02M 5/271 363/160 |
| 5,559,685 A | 9/1996 | Lauw et al. | |
| 5,870,292 A | 2/1999 | Lipo et al. | |
| 6,118,678 A | 9/2000 | Limpaecher et al. | |
| 6,654,261 B2 | 11/2003 | Welches et al. | |
| 6,657,874 B2 * | 12/2003 | Yu | H02M 5/271 363/50 |
| 7,327,113 B2 * | 2/2008 | Steigerwald | H02M 3/1582 290/40 B |
| 7,599,196 B2 * | 10/2009 | Alexander | H02M 3/1582 363/124 |
| 7,619,906 B2 * | 11/2009 | Schnetzka | H02H 9/001 363/34 |
| 7,778,045 B2 * | 8/2010 | Alexander | H02M 3/1582 363/124 |
| 7,944,723 B2 * | 5/2011 | Crane | H02M 7/219 323/239 |
| 2006/0103341 A1 | 5/2006 | Steigerwald et al. | |
| 2008/0013351 A1 | 1/2008 | Alexander | |
| 2012/0033464 A1 | 2/2012 | Alexander | |
| 2012/0307531 A1 | 12/2012 | Toliyat et al. | |

OTHER PUBLICATIONS

Amirabadi, et al. "Soft Switched AC-Link Direct-Connect Photovoltaic Inverter" 2008, IEEE, pp. 116-120.

Balakrishnan, et al. "Soft Switched AC Link Buck Boost Converter" 2008, IEEE, pp. 1334-1339.

Balakrishnan, et al. "Soft Switched AC-Link Wind Power Converter" 2008, IEEE, pp. 318-321.

Lipo, et al. "Recent Progress in the Development of Solid-State AC Motor Drives" IEEE Transactions on Power Electronics, vol. 3, No. 2, pp. 105-117, Apr. 1988.

Toliyat, et al. "Soft Switched AC-Link AC/AC and AC/DC Buck-Boost Converter" 2008, IEEE, pp. 4168-4176.

Amirabadi, et al. "A Multi-input AC Link PV Interverter with Reduced Size and Weight" 2012, IEEE, pp. 389-396.

Amirabadi, et al. "Battery-Utility Interface using Soft Switched AC Link Link Supporting Low Voltage Ride Through" 2009, IEEE, pp. 2606-2613.

* cited by examiner

Mode 2, 4, 6, 8

Mode 9

SPARSE AND ULTRA-SPARSE PARTIAL RESONANT CONVERTERS

CROSS REFERENCE TO RELATED APPLICATIONS

This application claims priority to and is: (1) a continuation-in-part application of U.S. patent application Ser. No. 13/486,627 filed on Jun. 1, 2012, which is a non-provisional application of U.S. Provisional Patent Application Ser. No. 61/493,210 filed on Jun. 3, 2011; and (2) a non-provisional application of U.S. Provisional Patent Application Ser. No. 61/831,446 filed on Jun. 5, 2013. The entire contents of the foregoing patent applications are hereby incorporated by reference.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

FIELD OF THE INVENTION

This disclosure relates in general to power converters and more particularly to sparse and ultra-sparse partial resonant converters.

BACKGROUND ART

In general, power conversion involves converting electric energy from one form to another. For example, power conversion may include converting between alternating current (AC) and direct current (DC), changing from one voltage or frequency to another, or some combination of these. As a specific example, an AC-AC converter converts an AC waveform to another AC waveform. Typical converters require numerous switches and are therefore complicated and expensive.

Partial resonant converters have several advantages over the other types of converters including cycloconverters, matrix converters, resonant converters and DC link converters. This universal power converter is a suitable candidate for variety of applications as it can overcome most of the problems associated with the other types of converters.

In partial resonant converters that are categorized as AC-link converters, the link frequency can be as high as allowed by the switches and control processor. Such converters are in fact AC-AC, DC-AC, AC-DC, or DC-DC buck-boost converters with an alternating inductor current and voltage. Therefore, unlike cycloconverters and matrix converters, this converter is capable of both stepping up and stepping down the voltage and frequency. Alternating inductor current and voltage, which maximizes the inductor/capacitor utilization, is achievable through bi-directional switches.

Partial resonant AC link converters, also called AC-link universal power converters, are compact, reliable, and efficient and offer longer life times compared to other types of converters. However, partial resonant AC link converters typically require numerous switches, which may require complicated controls and processing. For example, FIG. 1 is a circuit diagram of a typical partial resonant converter 100 disclosed in U.S. Pat. No. 7,599,196 requires 12 bidirectional-conducting-bidirectional-blocking switches which are usually formed by 24 forward-conducting-bidirectional-blocking switches or 24 bidirectional-conducting-forward-blocking switches (S0 through S23).

The switches (S0 through S23) in the partial resonant converter 100 turn on at zero voltage and have a soft turn off. Therefore, the voltage and current stress over the switches are reduced and the switches have negligible switching losses. Since the switching losses are negligible, the switching frequency and consequently the link frequency can be very high. Compared to DC-link converters, the size and reliability of this converter is improved while offering a longer lifetime. The control algorithm in this converter guarantees the isolation of the input and output; however, if galvanic isolation is required, a single-phase high frequency transformer may be added to the link.

The partial resonant converter 100 transfers power entirely through the link inductor L which is charged through the input phases and then discharged into the output phases. The frequency of the charge/discharge is called the link frequency and is typically much higher than the input/output line frequency. Between each charging and discharging there is a resonating mode during which none of the switches conduct and the LC link resonates to facilitate the soft switching. Charging and discharging of the LC link in a reverse direction is feasible through complimentary switches located at each leg which leads to an alternating current in the link.

The resulting input and output current pulses should be precisely modulated such that when filtered, they achieve unity (or desired) power factor at the inputs while meeting the output references. In an AC-AC converter, there are three input phases and one link to be charged through these input phases. In order to have more control on the input currents, close to unity or desired PF at input, and minimized input and output harmonics, the link charging mode is split into two modes. Similarly link discharging can be split into two modes. Again between each charging or discharging mode there is a resonating mode which facilitates zero voltage turn on. In other words, charging is done via two input phase pairs (during modes 1 and 3) which are nominally the lines having the highest and the second highest instantaneous voltages (for unity power factor). The charged link discharges into two output phase pairs similar to the charging process.

The basic operating modes and relevant converter waveforms for the three-phase AC-AC conversion case are represented in FIGS. 2A-2F and FIG. 3, respectively. Each link cycle is divided into 16 modes, with 8 power transfer modes and 8 partial resonant modes taking place alternately. The link is energized from the inputs during modes 1, 3, 9 and 11 and is de-energized to the outputs during modes 5, 7, 13 and 15.

Mode 1 (Energizing) is shown in FIGS. 2A and 3. Before the start of mode 1, the incoming switches, input switches which are supposed to conduct during modes 1 and 3, are fired (S6, S10 and S11), however they do not conduct since they are reverse biased. Once the link voltage, which is resonating before mode 1, becomes equal to the maximum input line-to-line voltage ($V_{AB}$), proper switches (S6 and S10) are forward biased initiating mode 1. This implies that the turn on occurs at zero voltage as the switches transition from reverse to forward bias. Therefore, the link is connected to $V_{AB\_i}$ via switches which charge it in the positive direction. The link charges until phase B input current averaged over a cycle time, meets its reference value. Switch S10 is then turned off.

Mode 2 (Partial Resonance) is shown in FIGS. 2B and 3. During this mode none of the switches conduct and the link resonates until its voltage becomes equal to that of the input phase pair that is supposed to charge the link during mode 3 ($V_{AC\_i}$). This is the phase pair the link charges next from. In this mode, the circuit behaves as a simple LC circuit.

Mode 3 (Energizing) is shown in FIGS. 2C and 3. Once the link voltage is equal to the voltage across the input phases AC_i, switches S6 and S11 are forward biased initiating mode 3, during which the link continues charging in the positive direction from $V_{AC\_i}$.

Mode 4 (Partial Resonance) is shown in FIGS. 2B and 3. During mode 4, the behavior of the circuit is similar to that of mode 2 and the link voltage decreases until it reaches zero. At this point the incoming cells, the output switches that are supposed to conduct during modes 5 and 7 (S19, S20 and S21 in FIGS. 5 and 6) are turned on; however being reverse biased they do not conduct. Once the link voltage reaches $V_{AC\_O}$ (Assuming $|V_{AC\_O}|$ is smaller than $|V_{AB\_O}|$) switches S21 and S20 will be forward biased and they start to conduct initiating mode 5.

Mode 5 (De-energizing) is shown in FIGS. 2D and 3. The output switches (S20 and S21) are turned on at zero voltage to allow the link to discharge to the chosen phase pair until phase C output current averaged over the cycle meets its reference. At this point S20 will be turned off initiating another resonating mode.

Mode 6 (Partial Resonance) is shown in FIGS. 2B and 3. The link is allowed to swing to the voltage of the other output phase pair chosen during Mode 4 (e.g., swings from $V_{AC\_O}$ to $V_{AB\_O}$).

Mode 7 (De-energizing) is shown in FIGS. 2E and 3. The link discharges to the selected output phase pair until there is just sufficient energy left in the link to swing to a predetermined voltage ($V_{max}$) which is slightly higher than the maximum input and output line to line voltages. At the end of mode 7 all the switches are turned off allowing the link to resonate during mode 8.

Mode 8 (Partial Resonance) is shown in FIGS. 2B and 3. The link voltage swings to $-V_{max}$ and then it starts to decrease.

Modes 9 through 16 are similar to modes 1 through 8, except that the link charges and discharges in the reverse direction. See e.g., mode 9 shown in FIG. 2F. For this, the complimentary switch in each leg is switched when compared to the ones switched during modes 1 through 8.

FIG. 4 illustrates the link current, link voltage, current passing through switch S20 and current passing through switch S17 in the partial resonant converter 100. FIGS. 5 and 6 illustrate filtered input and output currents of the partial resonant converter of FIG. 1.

BRIEF SUMMARY OF THE INVENTION

A novel topology for transforming electric power is described herein. The input and output of the sparse or ultra-sparse partial resonant converter can be either AC (single-phase or multi-phase) or DC. The sparse or ultra-sparse partial resonant converter contains fewer switches as compared to the prior art (e.g., 24), which results in less complexity, more compactness and higher reliability. For example, the number of switches in a three-phase AC-AC converter can be reduced to 20 switches (in sparse partial resonant converter) or 16 switches (in ultra-sparse partial resonant converter). In the case of a DC-AC converter, the number of switches can be reduced to 10 switches.

The AC portion of the sparse partial resonant power converter (input or output) contains three pairs of forward-conducting-bidirectional-blocking switches connected in a first direction, and two pairs of forward-conducting-bidirectional-blocking switches connected in a second direction to the three pairs of forward-conducting-bidirectional-blocking switches. The second direction is opposite to the first direction.

The AC portion of the input of the ultra-sparse partial resonant power converter contains three pairs of forward-conducting-bidirectional-blocking switches connected in a first direction, and two pairs of forward-conducting-forward-blocking switches connected in a second direction to the three pairs of forward-conducting-bidirectional-blocking switches. The second direction is opposite to the first direction. The forward-conducting-bidirectional-blocking devices can be switches in series with diodes. The forward-conducting-forward-blocking switches can be switches.

The AC portion of the output of the ultra-sparse partial resonant power converter contains three pairs of forward-conducting-bidirectional-blocking switches connected in a first direction, and two pairs of forward-conducting-reverse-blocking devices connected in a second direction to the three pairs of forward-conducting-bidirectional-blocking switches. The second direction is opposite to the first direction. The forward-conducting-bidirectional-blocking devices can be switches in series with diodes. The forward-conducting-reverse-blocking devices can be diodes.

For example, an input or output switching circuit for a power converter includes: (a) two or more pairs of forward-conducting-bidirectional-blocking switches connected in a first direction; (b) two pairs of forward-conducting-bidirectional-blocking devices connected in a second direction to the two or more pairs of forward-conducting-bidirectional-blocking switches whenever the input or output switching circuit is a sparse input or output switching circuit; (c) two pairs of forward-conducting-forward-blocking devices connected in the second direction to the two or more pairs of forward-conducting-bidirectional-blocking switches whenever the input or output switching circuit is an ultra-sparse input switching circuit; and (d) two pairs of forward-conducting-reverse-blocking devices connected in the second direction to the two or more pairs of forward-conducting-bidirectional-blocking switches, whenever the input or output switching circuit is an ultra-sparse output switching circuit. The second direction is opposite to the first direction.

An input or output sparse switching circuit for a power converter includes two or more pairs of forward-conducting-bidirectional-blocking switches connected in a first direction, and two pairs of forward-conducting-bidirectional-blocking devices connected in a second direction to the two or more pairs of forward-conducting-bidirectional-blocking switches. The second direction is opposite to the first direction.

A sparse partial resonant converter includes a first switching circuit, a second switching circuit and a partial resonant link circuit connected between the first switching circuit and the second switching circuit. The first switching circuit includes at least two pairs of first forward-conducting-bidirectional-blocking switches connected in a first direction and two pairs of first forward-conducting-bidirectional-blocking devices connected in a second direction to the at least two pairs of first forward-conducting-bidirectional-blocking switches, wherein the second direction is opposite to the first direction. The second switching circuit includes at least two pairs of second forward-conducting-bidirectional-blocking switches connected in the first direction and two pairs of second forward-conducting-bidirectional-blocking devices connected in the second direction to the at least two pairs of second forward-conducting-bidirectional-blocking switches.

An input or output ultra-sparse switching circuit for a power converter includes two or more pairs of forward-conducting-bidirectional-blocking switches connected in a first direction, two pairs of forward-conducting-forward-blocking devices connected in the second direction to the two or more pairs of forward-conducting-bidirectional-blocking switches whenever the input or output switching circuit is an ultra-sparse input switching circuit, and two pairs of forward-conducting-reverse-blocking devices connected in the second direction to the two or more pairs of forward-conducting-bidirectional-blocking switches, whenever the input or output switching circuit is an ultra-sparse output switching circuit. The second direction is opposite to the first direction.

An ultra-sparse partial resonant converter includes a first switching circuit, a second switching circuit and a partial resonant link circuit connected between the first switching circuit and the second switching circuit. The first switching circuit includes two or more pairs of first forward-conducting-bidirectional-blocking switches connected in a first direction, and either two pairs of first forward-conducting-forward-blocking devices connected in a second direction to the two or more pairs of first forward-conducting-bidirectional-blocking switches whenever the first switching circuit is an input switching circuit or two pairs of first forward-conducting-reverse-blocking devices connected in the second direction to the two or more pairs of first forward-conducting-bidirectional-blocking switches whenever the first switching circuit is an output switching circuit. The second switching circuit includes two or more pairs of second forward-conducting-bidirectional-blocking switches connected in the first direction, and either two pairs of second forward-conducting-forward-blocking devices connected in the second direction to the two or more pairs of second forward-conducting-bidirectional-blocking switches whenever the second switching circuit is the input switching circuit or two pairs of second forward-conducting-reverse-blocking devices connected in the second direction to the two or more pairs of second forward-conducting-bidirectional-blocking switches whenever the second switching circuit is the output switching circuit. The second direction is opposite to the first direction.

Technical advantages of certain embodiments will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE SEVERAL VIEWS OF THE DRAWINGS

For a more complete understanding of the present disclosure and its advantages, reference is now made to the following description, taken in conjunction with the accompanying drawings, in which.

DETAILED DESCRIPTION OF THE INVENTION

Figure 1:
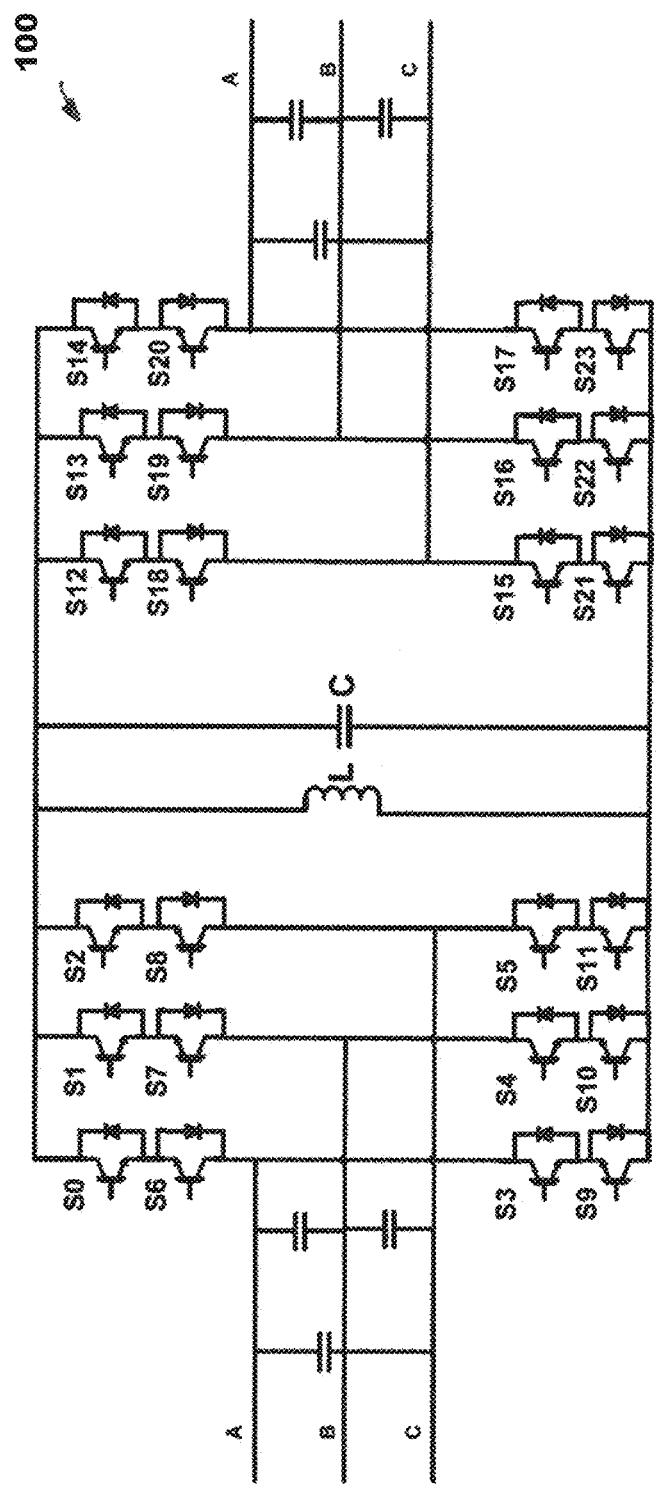
FIG. 1 is a circuit diagram of a three-phase AC-AC partial resonant converter in accordance with the prior art.
Figure 2A:
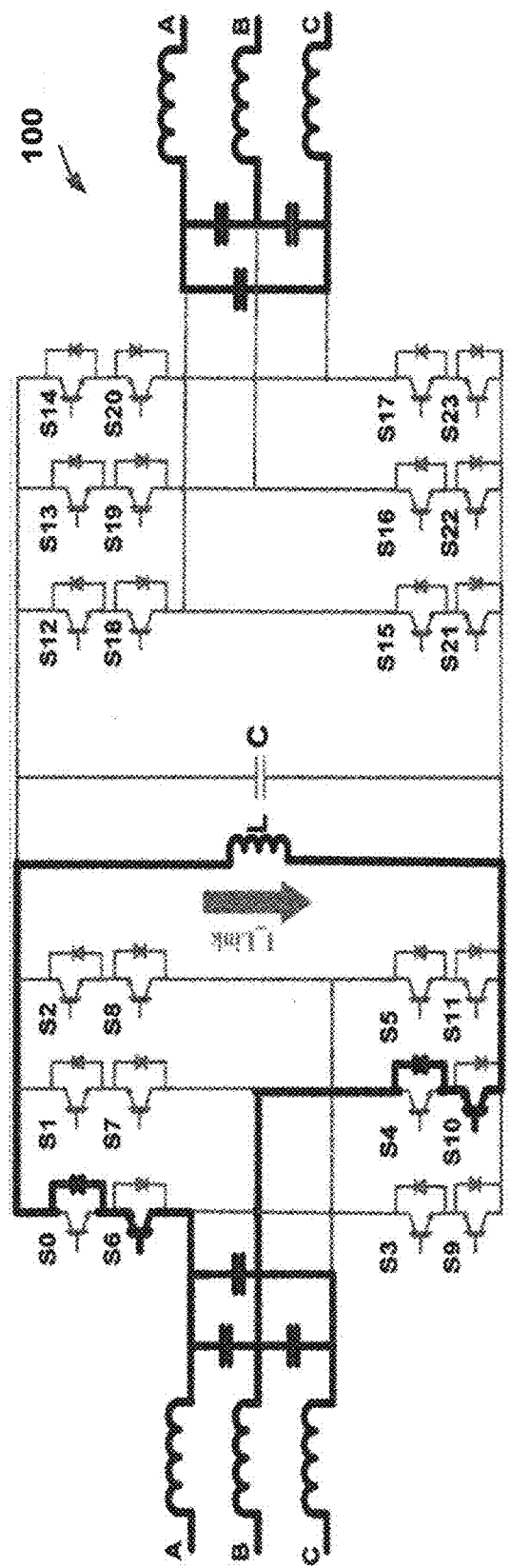
FIGS. 2A through 2F illustrate behavior of the partial resonant converter of FIG. 1 in different modes in accordance with the prior art.
Figure 2B:
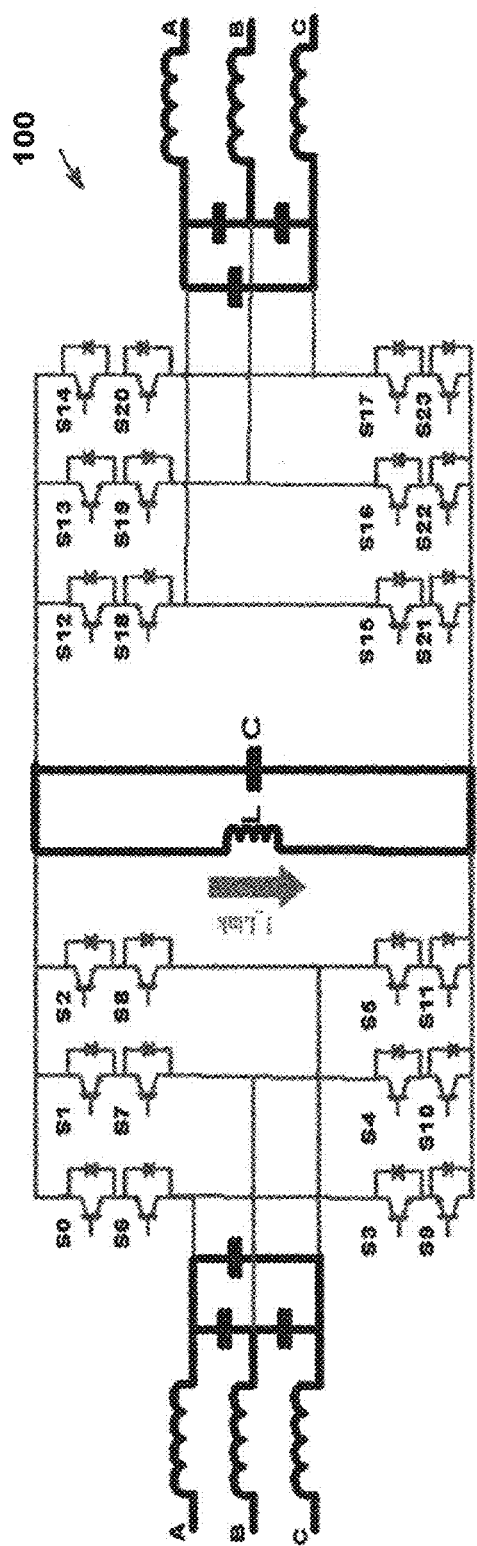
Figure 2C:
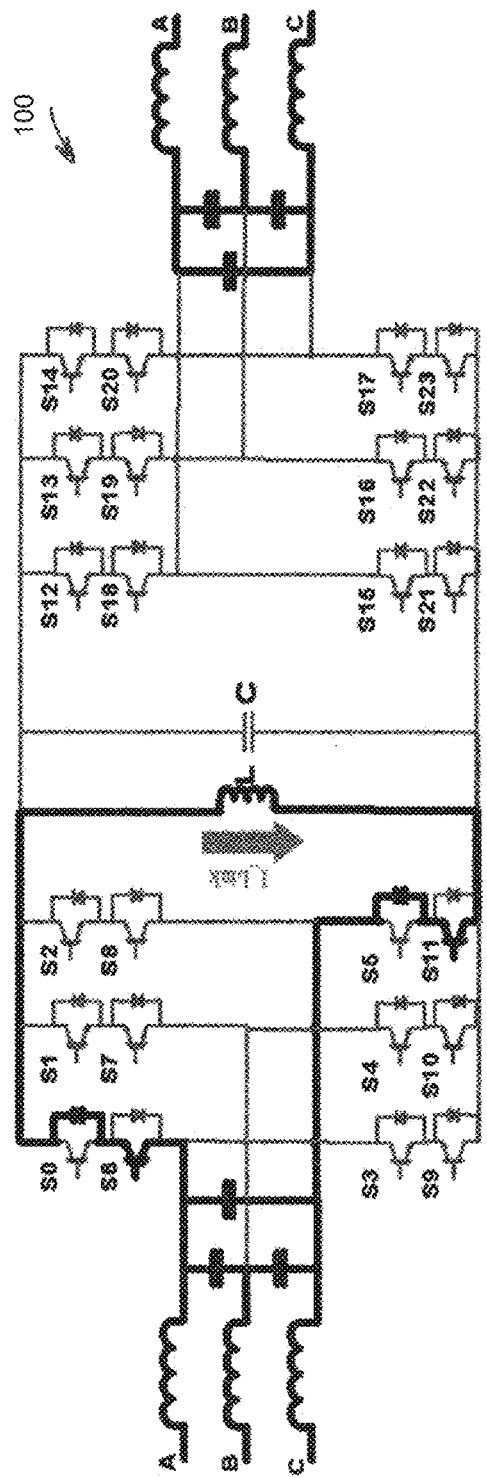
Figure 2D:
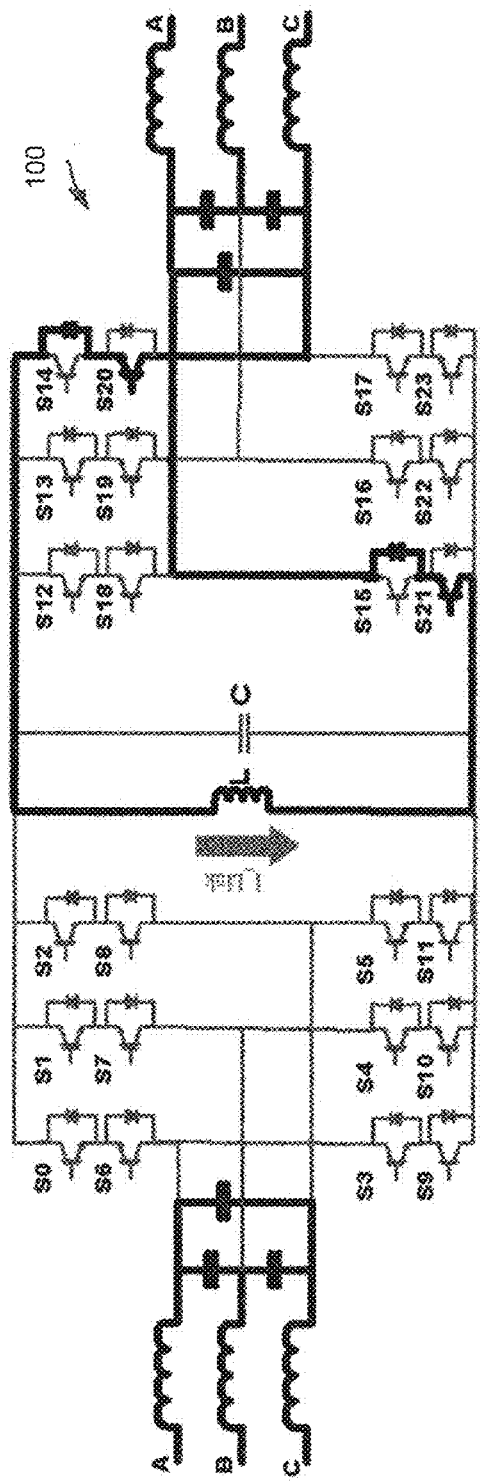
Figure 2E:
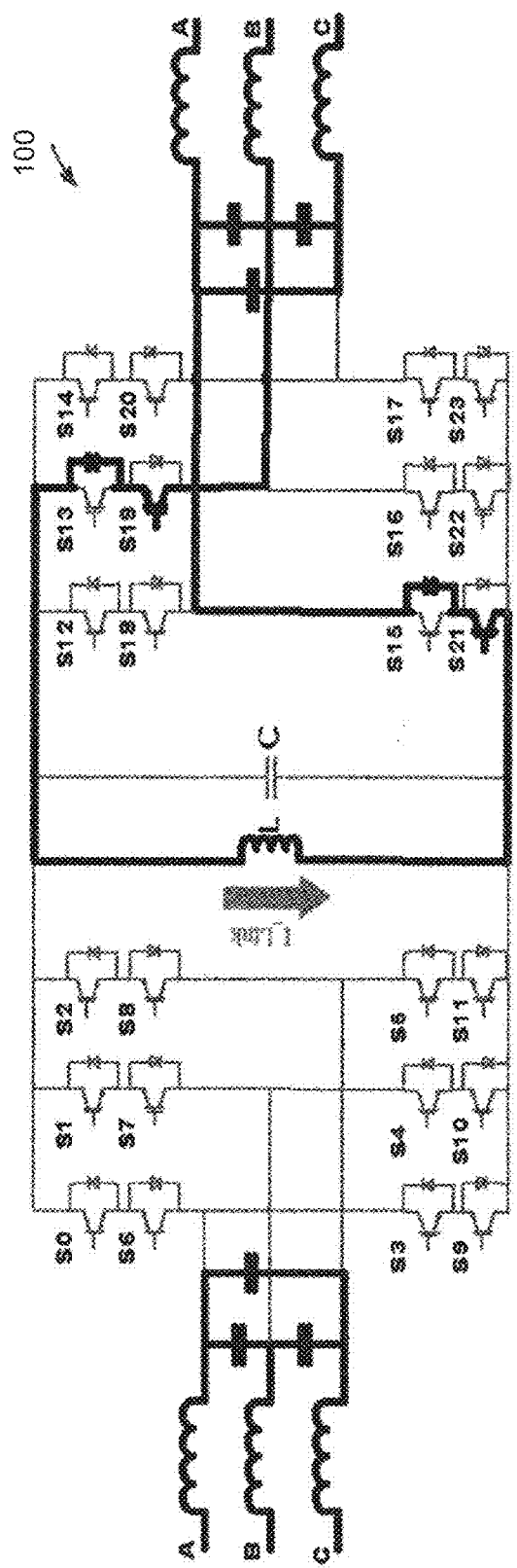
Figure 2F:
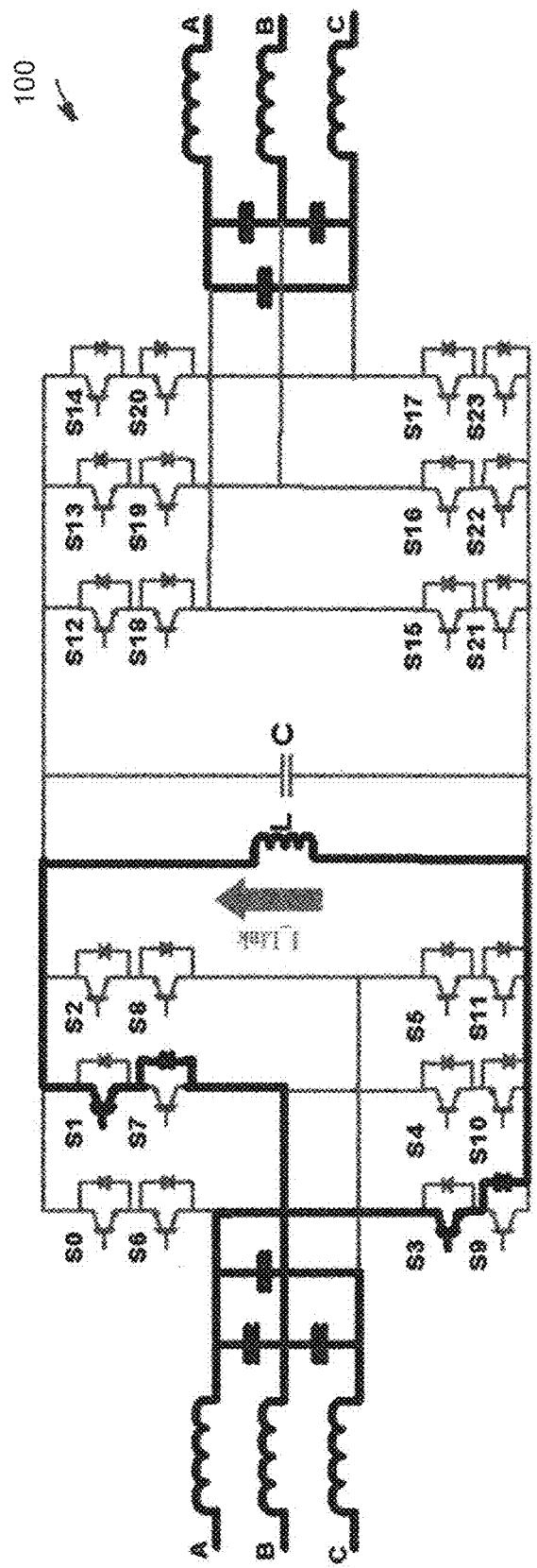

The teachings of the disclosure recognize that less complex partial resonant converters are desired for applications that do not need bi-directional power flow. Such applications may include, for example, converters that interface a power grid and wind-driven or wave-driven generators. The included figures illustrate embodiments of ultra-sparse partial resonant converters that include a reduced number of switches from typical partial resonant converters.

In general, an ultra-sparse partial resonant converter includes a configuration that reduces the number of switches from 24 in a typical three-phase AC-AC partial resonant converter to 20 in the case of a sparse resonant converter and 16 in the case of an ultra-sparse resonant converter. The ultra-sparse partial resonant converter is especially useful for applications that do not need bi-directional power flow. Among these applications are converters interfacing a power grid and wind-driven or wave-driven generators.

The principles of operation in the sparse and ultra-sparse partial resonant converters are similar to that of a typical partial resonant converter. Despite reducing the number of switches to 20 or 16, the partial resonant time during which no power is transferred is still very short. Therefore, the partial resonant link, which includes a parallel inductor and capacitor, has low reactive ratings. The inductor is the main energy storage component and the capacitor is merely added to facilitate the soft switching. Moreover, no noticeable power is dissipated in the link due to resonance. In partial resonant converters, sparse partial resonant converters, and ultra-sparse partial resonant converters, the partial resonant time which facilitates zero voltage turn on and soft turn off should be kept as short as possible.

The sparse and ultra-sparse partial resonant converters include other advantages over typical converters. For example, the failure rate of the ultra-sparse partial resonant converter is significantly lower than that of typical converters and partial resonant and sparse partial resonant converters due to having fewer switches. Another important feature of the ultra-sparse partial resonant converter is that it may be formed by insulated-gate bipolar transistor (IGBT) modules, which are more compact and more cost effective as compared to discrete devices. Therefore, the ultra-sparse partial resonant converter is more compact, more reliable, less expensive, and less complicated compared to typical partial resonant converters.

As will be explained in more detail below, the AC portion of the input of the ultra-sparse partial resonant power converter contains three pairs of forward-conducting-bidirectional-blocking switches connected in a first direction, and two pairs of forward-conducting-forward-blocking switches connected in a second direction to the three pairs of forward-conducting-bidirectional-blocking switches. The second direction is opposite to the first direction. The forward-conducting-bidirectional-blocking devices can be switches in series with diodes. The forward-conducting-forward-blocking switches can be switches. The AC portion of the output of the ultra-sparse partial resonant power converter contains three pairs of forward-conducting-bidirectional-blocking switches connected in a first direction, and two pairs of forward-conducting-reverse-blocking devices connected in a second direction to the three pairs of forward-conducting-bidirectional-blocking switches. The second direction is opposite to the first direction. The forward-conducting-bidirectional-blocking devices can be switches in series with diodes. The forward-conducting-reverse-blocking devices can be diodes.

Accordingly, a sparse partial resonant power converter may contain a first switching circuit, a second switching circuit and a partial resonant link circuit connected between the first switching circuit and the second switching circuit. The first switching circuit includes at least two pairs of first forward-conducting-bidirectional-blocking switches connected in the first direction and two pairs of first forward-conducting-bidirectional-blocking devices connected in the second direction. The second switching circuit includes at least two pairs of second forward-conducting-bidirectional-blocking switches connected in a first direction and two pairs of second forward-conducting-reverse-blocking devices connected in a second direction. The second direction is opposite to the first direction.

Furthermore, an ultra-sparse partial resonant power converter may contain a first switching circuit, a second switching circuit and a partial resonant link circuit connected between the first switching circuit and the second switching circuit. The first switching circuit includes at least two pairs of first forward-conducting-bidirectional-blocking switches connected in the first direction and two pairs of first forward-conducting-forward-blocking devices connected in the second direction. The second switching circuit includes at least two pairs of second forward-conducting-bidirectional-blocking switches connected in a first direction and two pairs of second forward-conducting-reverse-blocking devices connected in a second direction. The second direction is opposite to the first direction.

Figure 7:
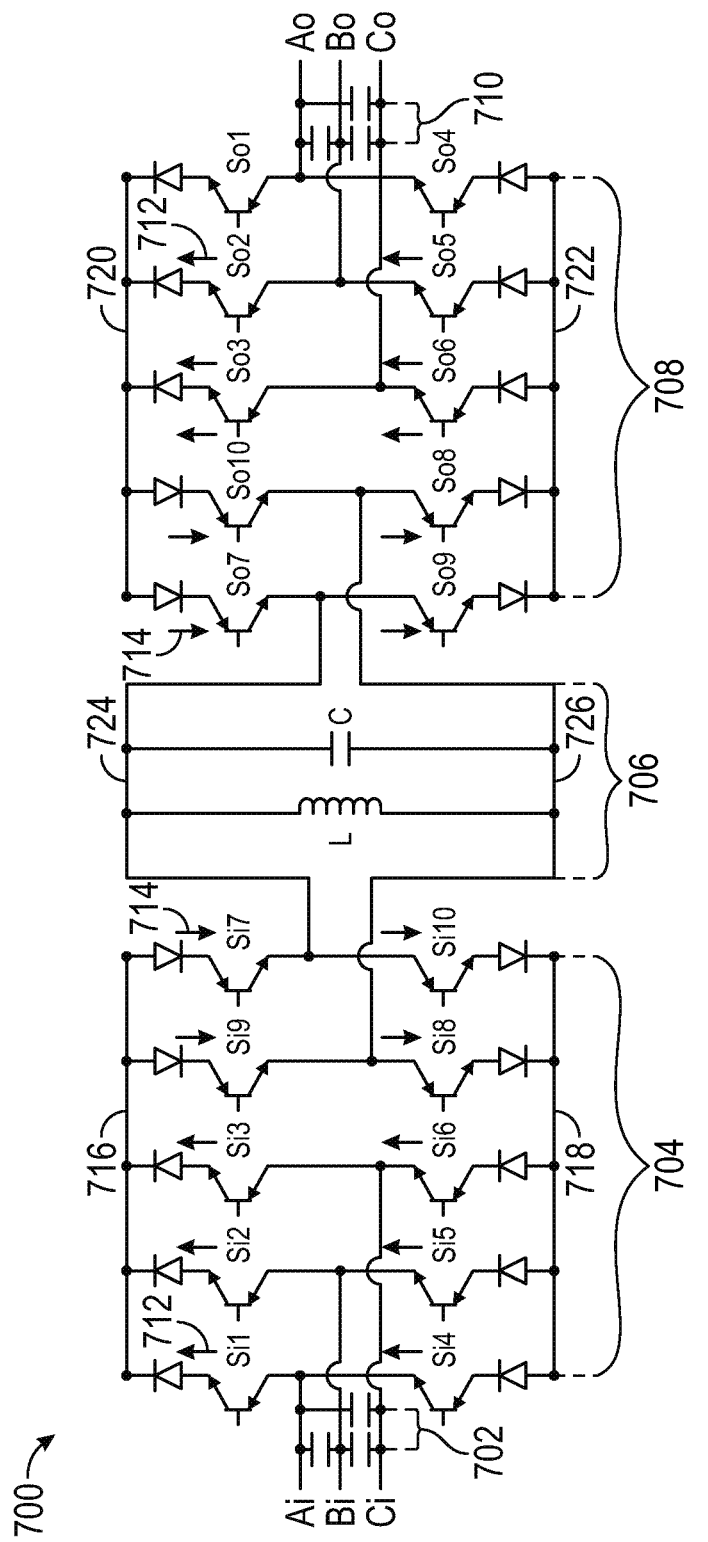
FIG. 7 is a circuit diagram of a sparse partial resonant converter in accordance with one embodiment of the present disclosure.

As previously described, the partial resonance converter of FIG. 1 contains a large number of switches which causes the control scheme to be more complicated. In order to simplify the control algorithm and further reduce the size of the converter, a modified configuration, a sparse partial resonant converter 700, is illustrated in FIG. 7. The number of switches in the three-phase AC-AC sparse partial resonant converter 700 has been reduced to 20 as compared to the three-phase AC-AC partial resonant converter 100 of FIG. 1. Both configurations 100 and 700 provide bi-directional power flow. However, there are several applications which do not require bi-directional power flow including wind power generation (AC-AC), tidal power generation (AC-AC) and photovoltaics (PV) power generation (DC-AC). The ultra-sparse partial resonant converter of FIGS. 8-10 and 20 can be used for these applications.

The three-phase AC-AC sparse partial resonant converter 700 includes an input Ai, Bi, Ci connected to a first filter capacitor circuit 702, a first switching circuit 704 connected to the filter capacitor circuit 702, a partial resonant link circuit 706 connected to the first switching circuit 704, a second switching circuit 708 connected to the partial resonant link circuit 706, a second filter capacitor circuit 710 connected to the second switching circuit 708 and an output Ao, Bo, Co connected to the second filter capacitor circuit 710. The partial resonant link circuit 706 includes an inductor (L) parallel connected to a capacitor (C). The sparse partial resonant converter 700 may also include a line reactor circuit (not shown) connected to the first filter capacitor circuit 702 and/or the second filter capacitor circuit 710. As shown, the first switching circuit 704 is an AC input switching circuit and the second switching circuit 708 is an AC output switching circuit, but the input and output can each be DC, single-phase AC, or multi-phase (three or more phases). The first switching circuit 704 and the second switching circuit 708 are controlled by a controller, processor or other suitable control circuit or device (not shown).

The first switching circuit 704 includes three pairs of first forward-conducting-bidirectional-blocking switches (Si1, Si4), (Si2, Si5), (Si3, Si6) connected in a first direction (arrow 712) and two pairs of first forward-conducting-bidirectional-blocking switches (Si9, Si8), (Si7, Si10) connected in a second direction (arrow 714). The second direction (arrow 714) is opposite to the first direction (arrow 712). Each pair of the three pairs of first forward-conducting-bidirectional-blocking switches (e.g., Si1, Si4) is connected such that one of the first forward-conducting-bidirectional-blocking switches (e.g., Si1) is series connected between the input (e.g., Ai) and a first port 716, and the other first forward-conducting-bidirectional-blocking switch (e.g., Si4) is series connected between the input (e.g., Ai) and a second port 718. One pair of the two pairs of first forward-conducting-bidirectional-blocking switches (Si7, Si10) is connected such that one of the first forward-conducting-bidirectional-blocking switches (Si7) is connected between the first port 716 and a top port 724 of the partial resonant link circuit 706, and the other first forward-conducting-bidirectional-blocking switch (Si10) is series connected between the second port 718 and the top port 724 of the partial resonant circuit 706. The other pair of the two pairs of first forward-conducting-bidirectional-blocking switches (Si8, Si9) is connected such that one of the first forwardconducting-bidirectional-blocking switches (Si9) is connected between the first port 716 and a bottom port 726 of the partial resonant link circuit 706, and the other first forward-conducting-bidirectional-blocking switch (Si8) is series connected between the second port 718 and the bottom port 726 of the partial resonant circuit 706. As shown, each first forward-conducting-bidirectional-blocking switch can be formed by a forward conducting forward blocking switch (like an insulated-gate bipolar transistor (IGBT)) series coupled with a reverse blocking diode, but each first forward-conducting-bidirectional-blocking switch can be a reverse blocking IGBT module, or other suitable switching device.

The second switching circuit 708 includes three pairs of second forward-conducting-bidirectional-blocking switches (So1, So4), (So2, So5), (So3, So6) connected in the first direction (arrow 712) and two pairs of second forward-conducting-bidirectional-blocking switches (Si9, Si8), (Si7, Si10) connected in the second direction (arrow 714). Each pair of the three pairs of second forward-conducting-bidirectional-blocking switches (e.g., So1, So4) is connected such that one of the second forward-conducting-bidirectional-blocking switches (e.g., So1) is series connected between the output (e.g., Ao) and a third port 720, and the other second forward-conducting-bidirectional-blocking switch (e.g., So4) is series connected between the output (e.g., Ao) and a fourth port 722. One pair of the two pairs of second forward-conducting-bidirectional-blocking switches (So7, So9) is connected such that one of the second forward-conducting-bidirectional-blocking switches (So7) is connected between the third port 720 and the top port 724 of the partial resonant link circuit 706, and the other second forward-conducting-bidirectional-blocking switch (So9) is series connected between the fourth port 722 and the top port 724 of the partial resonant circuit 706. The other pair of the two pairs of second forward-conducting-bidirectional-blocking switches (So8, So10) is connected such that one of the second forward-conducting-bidirectional-blocking switches (So10) is connected between the third port 720 and the bottom port 726 of the partial resonant link circuit 706, and the other second forward-conducting-bidirectional-blocking switch (So8) is series connected between the fourth port 722 and the bottom port 726 of the partial resonant circuit 706. As shown, each second forward-conducting-bidirectional-blocking switch can be formed by a forward-conducting-forward-blocking switch (like an IGBT) series coupled with a reverse blocking diode, but each first forward-conducting-bidirectional-blocking switch can be a reverse blocking IGBT module, or other suitable switching device.

Figure 8:
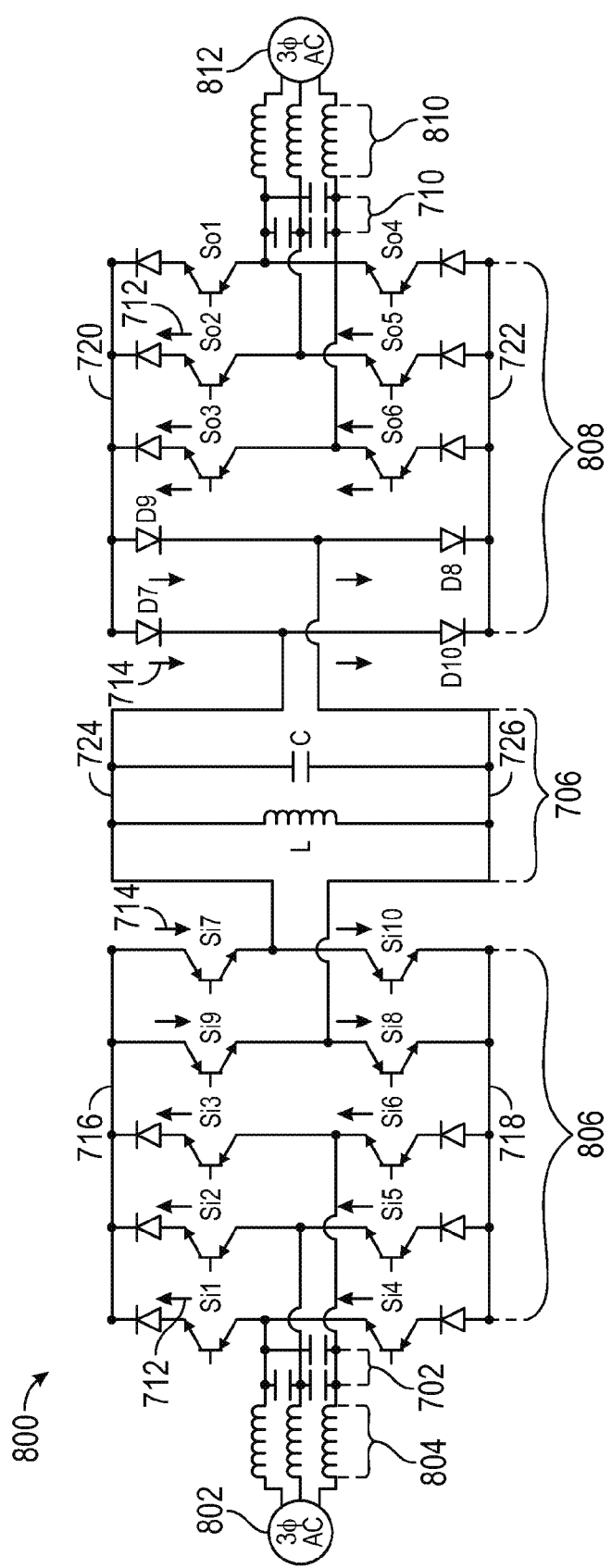
FIGS. 8-10 are circuit diagrams of ultra-sparse partial resonant converters in accordance with the embodiments of the present disclosure.

In order to further simplify the converter of FIG. 7 for applications that do not require bi-directional power flow, embodiments of an ultra-sparse partial resonant converter may be utilized. One embodiment of the ultra-sparse partial resonant converter is shown in FIG. 8, which includes 16 switches for three-phase AC-AC conversion.

The ultra-sparse partial resonant converter 800 includes an input 802 connected to a first line reactor circuit 804, a first filter capacitor circuit 702 connected to the first line reactor circuit 804, a first switching circuit 806 connected to the filter capacitor circuit 702, a partial resonant link circuit 706 connected to the first switching circuit 806, a second switching circuit 808 connected to the partial resonant link circuit 706, a second filter capacitor circuit 710, a second line reactor circuit 810 connected to the second filter capacitor circuit 710, and an output 812 connected to the second line reactor circuit 810. The partial resonant link circuit 706 includes an inductor (L) parallel connected to a capacitor (C). As shown, the first switching circuit 806 is an AC input switching circuit and the second switching circuit 808 is an AC output switching circuit, but the input and output can both be DC, single-phase AC, or multi-phase (three or more phases). The first switching circuit 806 and the second switching circuit 808 are controlled by a controller, processor or other suitable control circuit or device (not shown). Note that the first line reactor circuit 804 and the second line reactor circuit 810 are optional.

The first switching circuit 806 includes three pairs of first forward-conducting-bidirectional-blocking switches (Si1, Si4), (Si2, Si5), (Si3, Si6) connected in a first direction (arrow 712) and two pairs of first forward-conducting-forward-blocking switches (Si9, Si8), (Si7, Si10) connected in a second direction (arrow 714). The second direction (arrow 714) is opposite to the first direction (arrow 712). Each pair of the three pairs of first forward-conducting-bidirectional-blocking switches (e.g., Si1, Si4) is connected such that one of the first forward-conducting-bidirectional-blocking switches (e.g., Si1) is series connected between the first line reactor circuit 804 and a first port 716, and the other first forward-conducting-bidirectional-blocking switch (e.g., Si4) is series connected between the first line reactor circuit 804 and a second port 718. One pair of the two pairs of first forward-conducting-forward-blocking switches (Si7, Si10) is connected such that one of the first forward-conducting-forward-blocking switches (Si7) is connected between the first port 716 and the top port 724 of the partial resonant link circuit 706, and the other first forward-conducting-forward-blocking switch (Si10) is series connected between the second port 718 and the top port 724 of the partial resonant circuit 706. The other pair of the two pairs of first forward-conducting-forward-blocking switches (Si8, Si9) is connected such that one of the first forward-conducting-forward-blocking switches (Si9) is connected between the first port 716 and the bottom port 726 of the partial resonant link circuit 706, and the other first forward-conducting-forward-blocking switch (Si8) is series connected between the second port 718 and the bottom port 726 of the partial resonant circuit 706. As shown, each first forward-conducting-bidirectional-blocking switch is a switch series coupled with a reverse blocking diode, but each first forward-conducting-bidirectional-blocking switch can be a reverse blocking IGBT module, or other suitable switching device.

The second switching circuit 808 includes three pairs of second forward-conducting-bidirectional-blocking switches (So1, So4), (So2, So5), (So3, So6) connected in the first direction (arrow 712) and two pairs of second forward-conducting-reverse-blocking devices (D9, D8), (D7, D10) connected in the second direction (arrow 714). Each pair of the three pairs of second forward-conducting-bidirectional-blocking switches (e.g., So1, So4) is connected such that one of the second forward-conducting-bidirectional-blocking switches (e.g., So1) is series connected between the second line reactor circuit 810 and a third port 720, and the other second forward-conducting-bidirectional-blocking switch (e.g., So4) is series connected between the second line reactor circuit 810 and a fourth port 722. Each pair of the two pairs of second forward-conducting-reverse-blocking devices (e.g., D7, D10) is connected such that one of the second forward-conducting-reverse-blocking devices (e.g., D7) is connected between the third port 720 and the partial resonant link circuit 706, and the other second forward-conducting-reverse-blocking device (e.g., D10) is series connected between the fourth port 722 and the partial resonant circuit 706. As shown, each second forward-conducting-bidirectional-blocking switch is a switch in series with a diode, but each second forward-conducting-bidirectional-blocking device can be a reverse blocking IGBT module, or other suitable reverse blocking device. Also, each second forward-conducting-reverse-blocking device is a reverse blocking diode.

The link inductor is first charged through input and then it is discharged to the output. Between each charging and discharging there is a resonating mode during which none of the switches conduct and the inductor and capacitor resonate. This facilitates the zero voltage turn on of the switches. Once the link is discharged into the output, it will be charged again but in a reverse direction, followed by a resonating mode and then discharging in a reverse direction. The four diodes at the output side provide the path for the positive and negative link current. Two of these diodes conduct during the first half cycle of the link that the link current is positive and the other two provide a path for the negative link current in the second half cycle of the link. The main advantage of the diode over switch is that it does not require a gate driver which leads to a less complex and more compact design.

Figure 9:
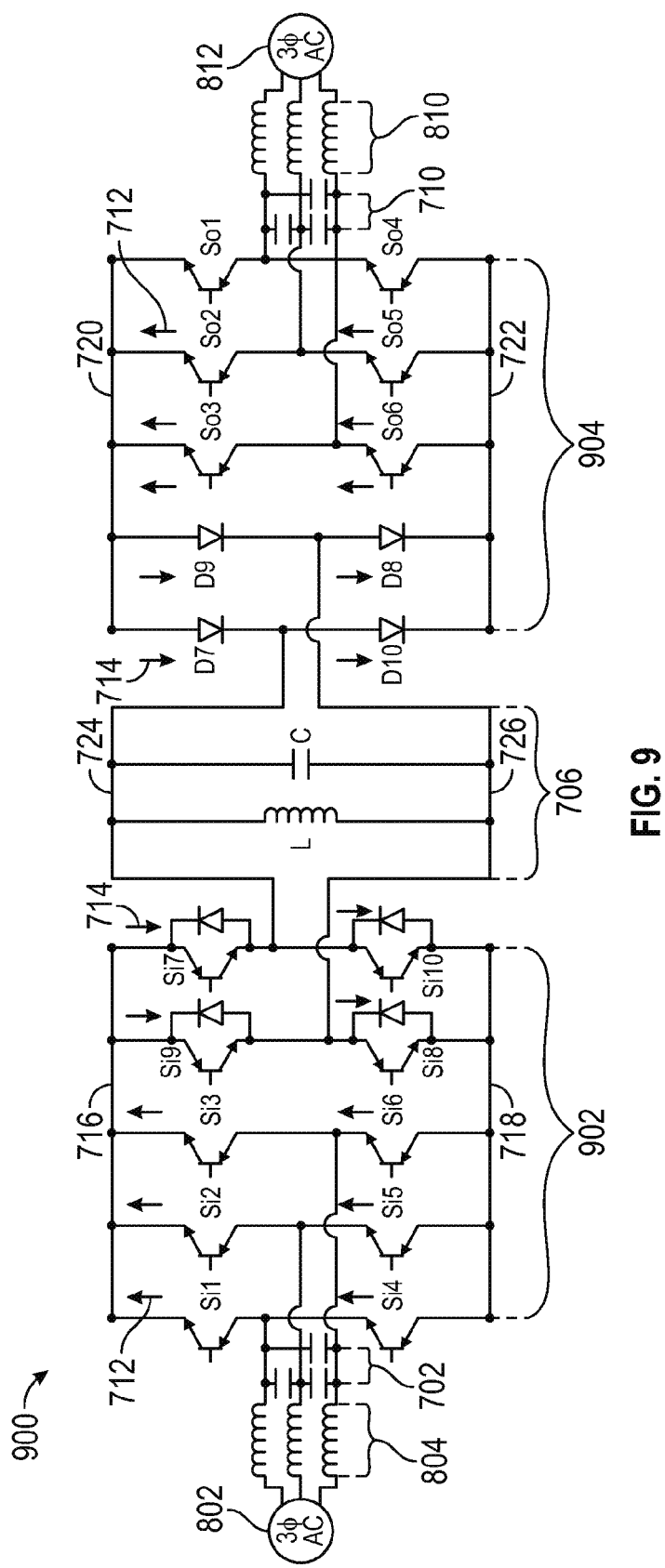
Figure 10:
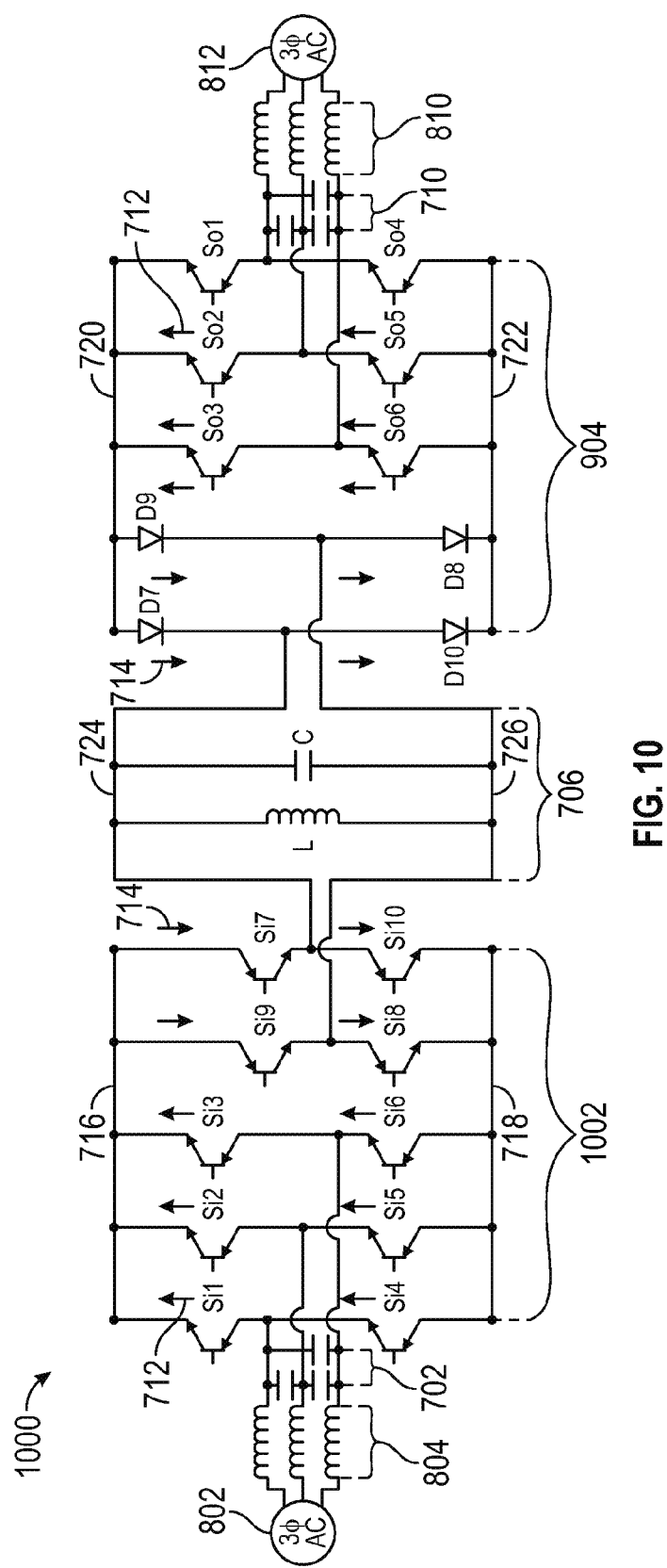
Figure 11A:
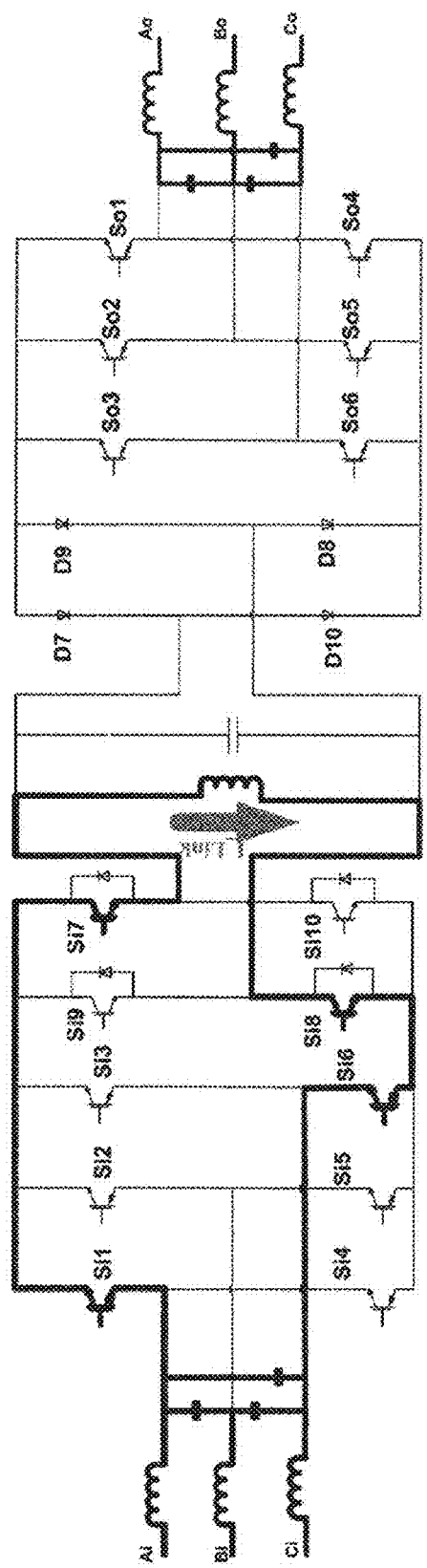
FIGS. 11A through 11F illustrate behavior of the ultra-sparse partial resonant converters of FIGS. 8-10 in different modes in accordance with the present disclosure.
Figure 11B:
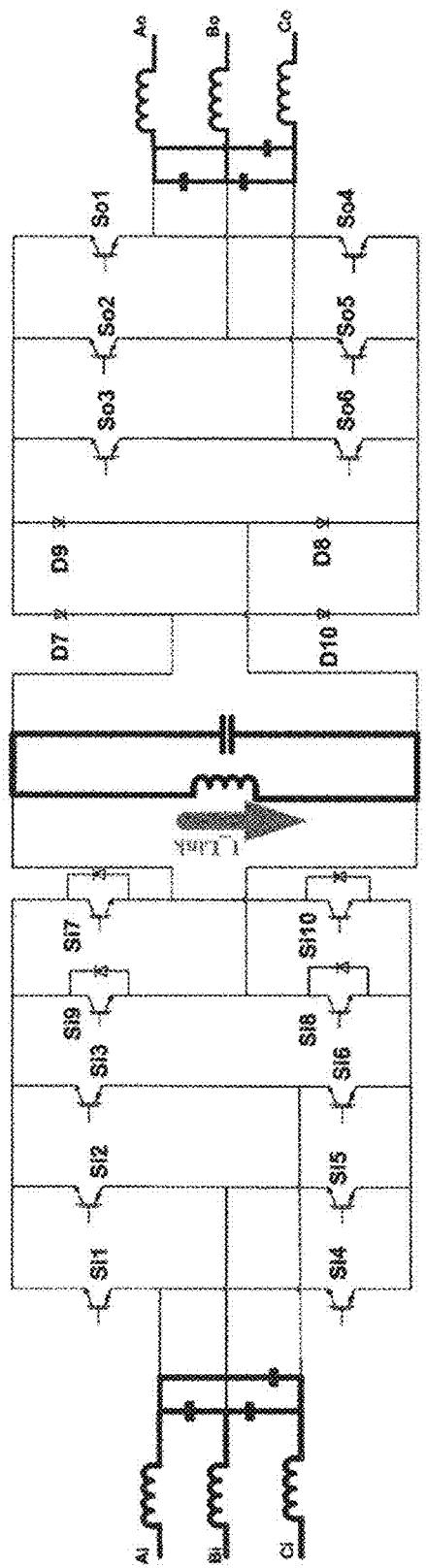
Figure 11C:
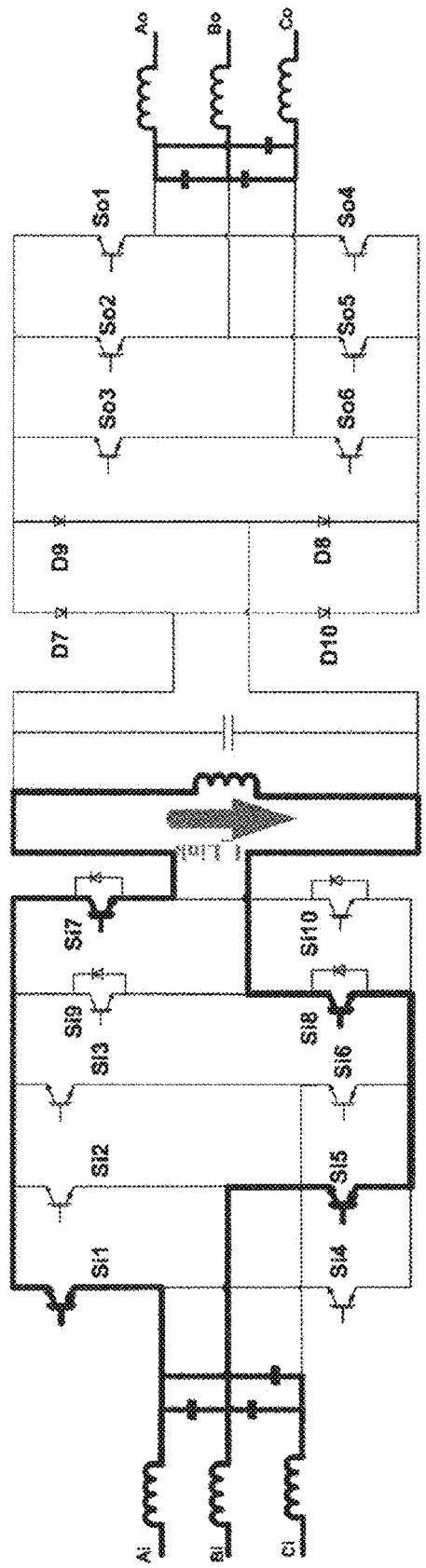
Figure 11D:
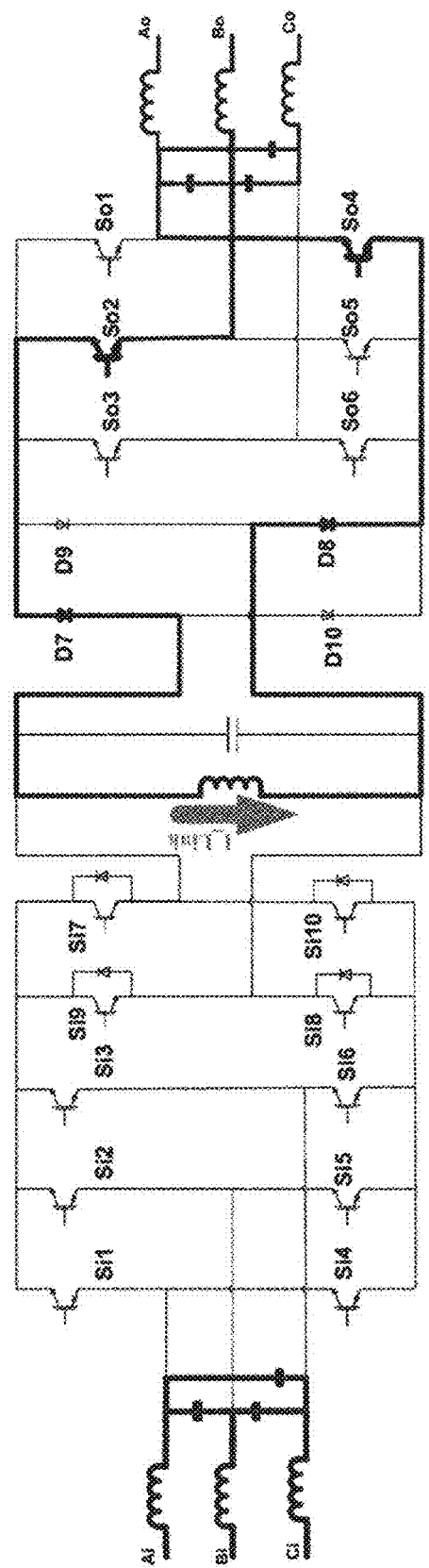
Figure 11E:
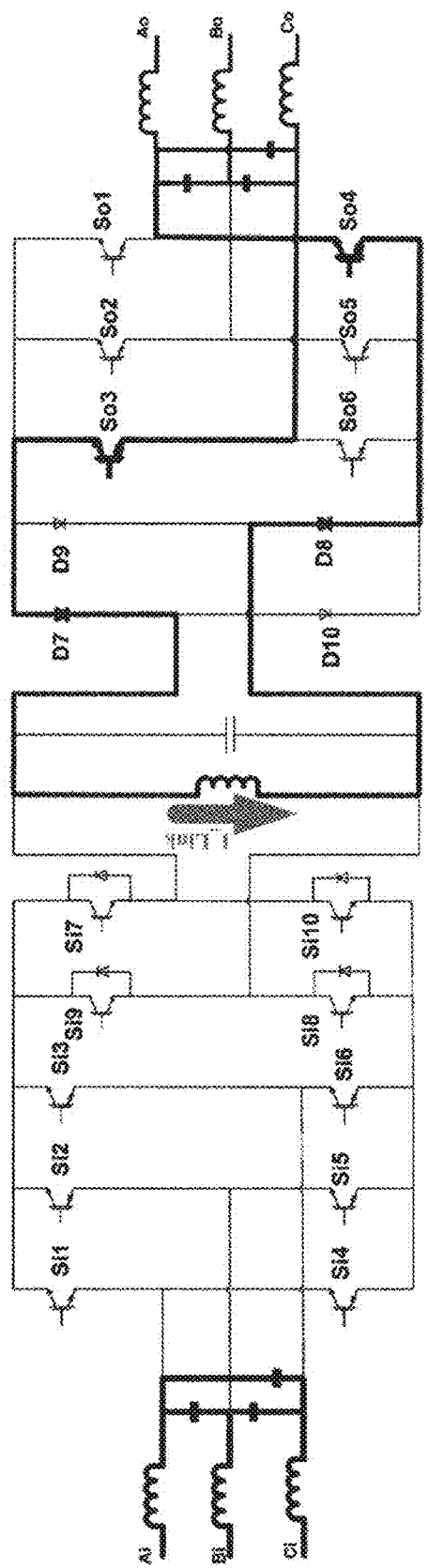
Figure 11F:
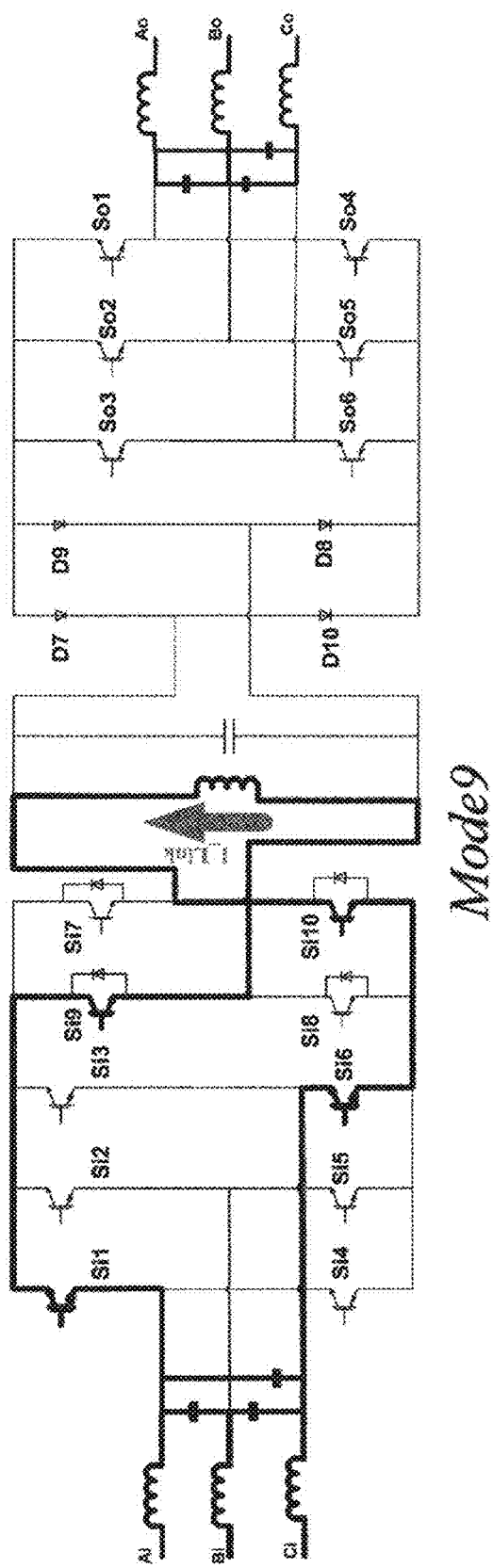

As shown in the ultra-sparse partial resonant converter 900 of FIG. 9, in the first switching circuit 902 and considering that most of the manufactured discrete IGBTs have an anti-parallel diode, switches Si7, Si8, Si9, and Si10 may be replaced with IGBTs having anti-parallel diodes. Moreover, the switch series coupled with a reverse blocking diode can be replaced with reverse blocking IGBTs in the first switching circuit 902 (Si1 through Si6) and the second switching circuit 904 (So1 through So6), which further simplifies the converter. Likewise as shown in the ultra-sparse partial resonant converter 1000 of FIG. 10, the IGBTs having anti-parallel diodes can be replaced with reverse blocking IGBTs in the first switching circuit 1002 (Si1 through Si6), which further simplifies the converter. As it will be shown below, the performance of the configurations of ultra-sparse partial resonant converter is similar to that of typical partial resonant converters. The link current and voltage are exactly the same as those of typical configurations and the partial resonant time is as short as it was in the typical converter.

The goal of the sparse and ultra-sparse configurations is to remove the complimentary switches while maintaining the exact same behavior as the original converter. To do so, intermediate crossover switching circuits in the sparse partial resonant converter (switches Si7, Si8, Si9 and Si10 at input side and switches So1, So8, So9 and So10 at output side) need to be added to the input and output switch bridges which contain merely unidirectional switches. This can be seen in FIG. 3, which is the same for all the converters. The intermediate crossover switching circuits permits the partially resonant circuit to be operated bi-directionally, which affords the advantages discussed above.

Figure 3:
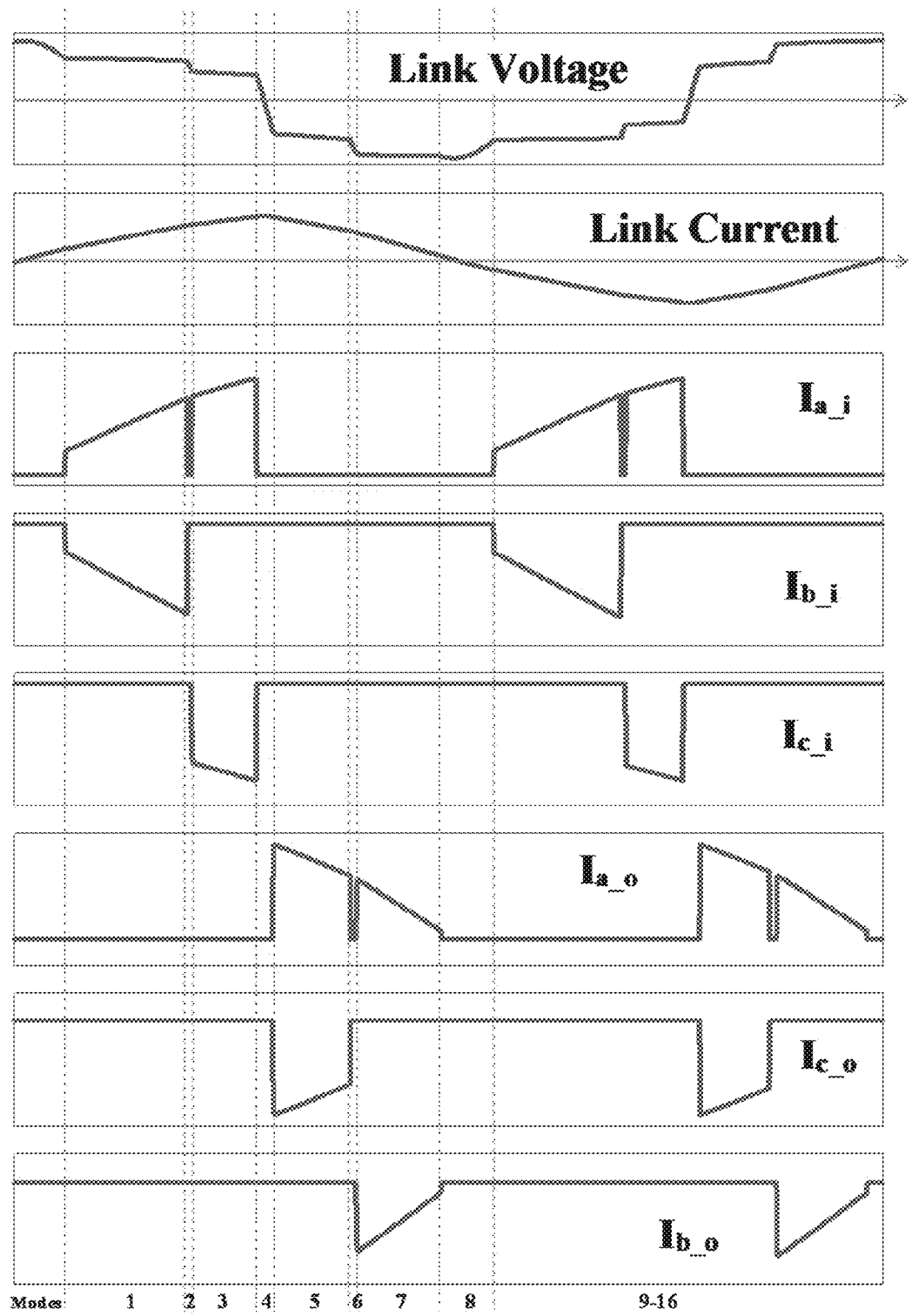
FIG. 3 illustrates link voltage, link current, and input and output currents of the partial resonant converter of FIG. 1 in accordance with the prior art.
Figure 4:
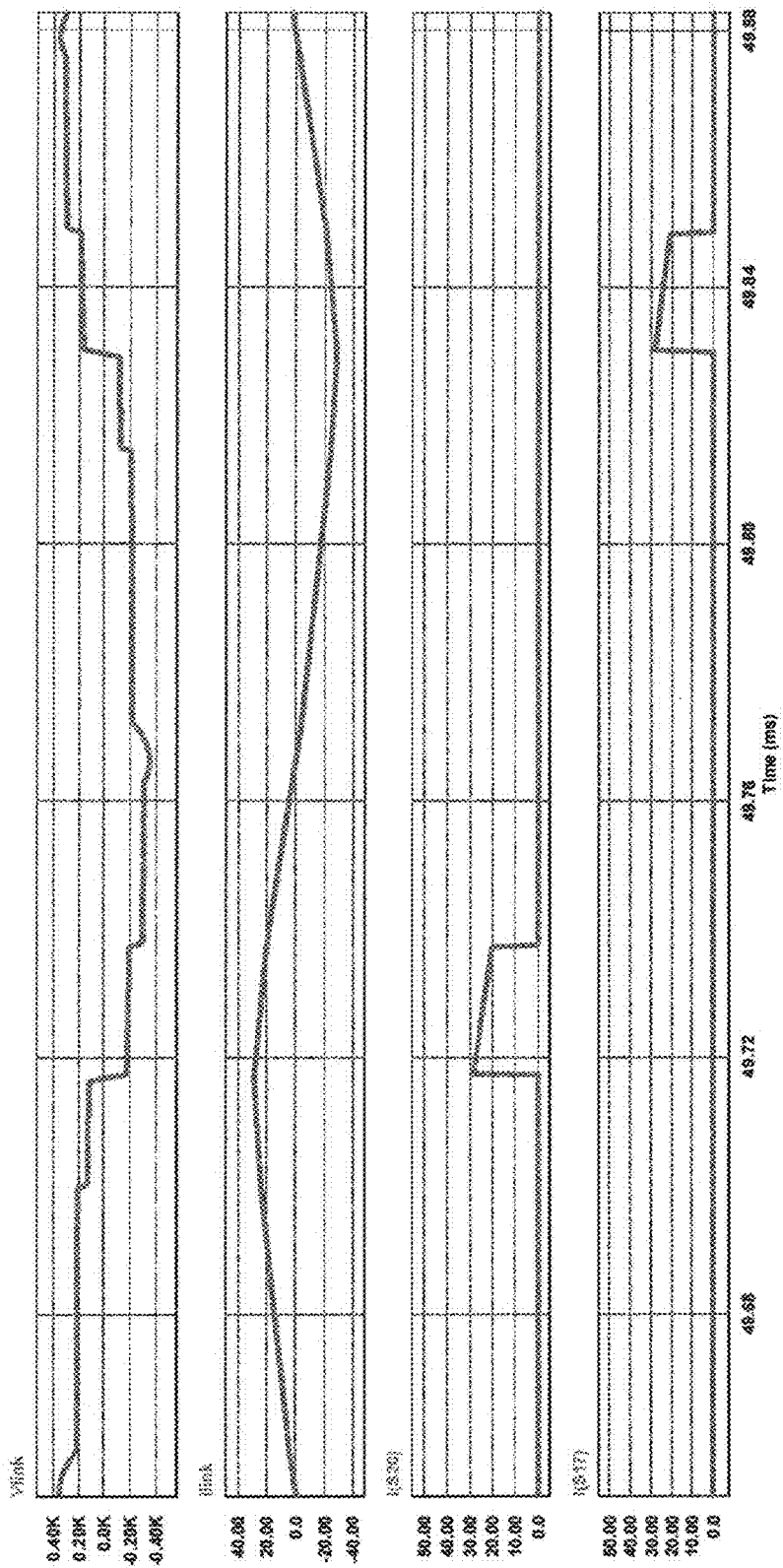
FIG. 4 illustrates the link current, link voltage current passing through switch S20, and current passing through switch S17 in the partial resonant converter of FIG. 1.

In the sparse configuration, shown in FIG. 7, the link current and voltage are exactly the same as the waveforms shown in FIG. 3 for the original converter; however, fewer switches are used. Modes 1-8 in the sparse configuration are similar to those of the original converter (FIGS. 2A-2E) except that other than turning on the proper switches on input/output switch bridges, Si7 and Si8 on the input side intermediate crossover switching circuit should be turned on during modes 1-4 and So1 and So8 on the output intermediate crossover switching circuit should be turned on during modes 5-8. Since the input and output switch bridges contain forward-conducting-bidirectional-blocking switches, Si7-Si10 and So1-So10 (referenced above as intermediate crossover switching circuits) enable the link to conduct both positive and negative currents. Therefore during modes 9-16, the same input/output switches as modes 1-8 will be conducting however instead of Si7 and Si8, switches Si9 and Si10 conduct during modes 9-12 and instead of So1 and So8, switches So9 and So10 conduct during modes 13-16. When the power flows from input side to the output side in the sparse configuration, the output intermediate crossover switching circuit, which is formed by switches So7, So8, So9, and So10, acts like a rectifier. In order to further simplify the converter, the switches So7, So8, So9, and So10 in the sparse partial resonant converter can be removed and the output intermediate crossover switching circuit can be formed by just diodes. Similar to the switches used in this circuit, the diodes start to conduct as they become forward biased. This forms the ultra-sparse partial resonant converter shown in FIG. 8. These diodes are not forward biased when they are not supposed to conduct. Considering the fact that the power direction is unidirectional and therefore, the link voltage is positive when Si7 and Si8 conduct and it is negative when Si9 and Si10 conduct, the reverse blocking diodes in the input side intermediate crossover switching circuit can be removed and replaced by anti-parallel diodes. By using reverse blocking IGBTs the reverse blocking diodes on the input and output switch bridge may also be removed.

FIGS. 11A-11F represent the behavior of the ultra-sparse partial resonant converter in different modes. The link voltage, link current, and input and output currents in the ultra-sparse partial resonant converter are as represented in FIG. 3.

The switch conduction loss of the ultra-sparse configuration is expected to be slightly higher than the partial resonant converter and lower than the sparse partial resonant converter. Failure rates are expected to be significantly lower than both the original converter and sparse partial resonant converters. In order to keep the efficiency the same as the original converter and reduce the failure rates, the input side in the DC-AC ultra-sparse partial resonant converter may be kept the same as the original converter and modify the output side.

Figure 5:
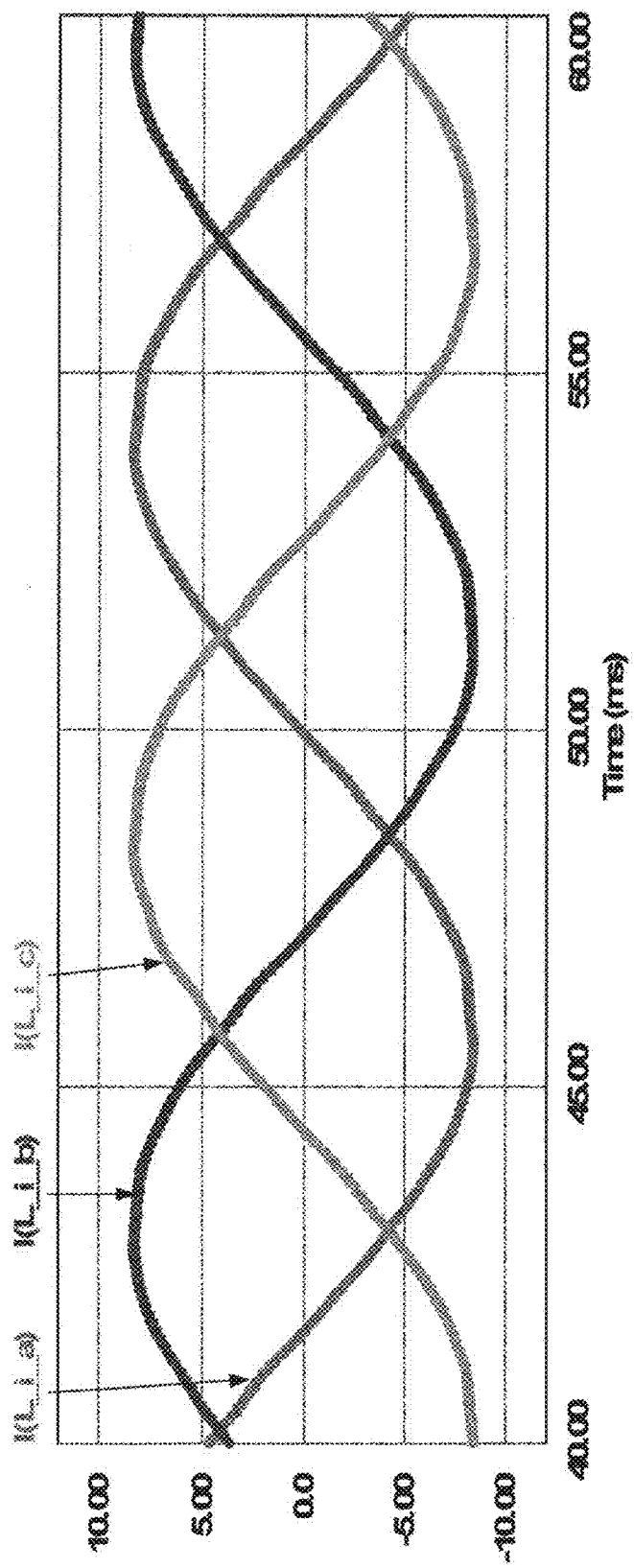
FIGS. 5 and 6 illustrate filtered input and output currents of the three-phase AC-AC partial resonant converter of FIG. 1.
Figure 6:
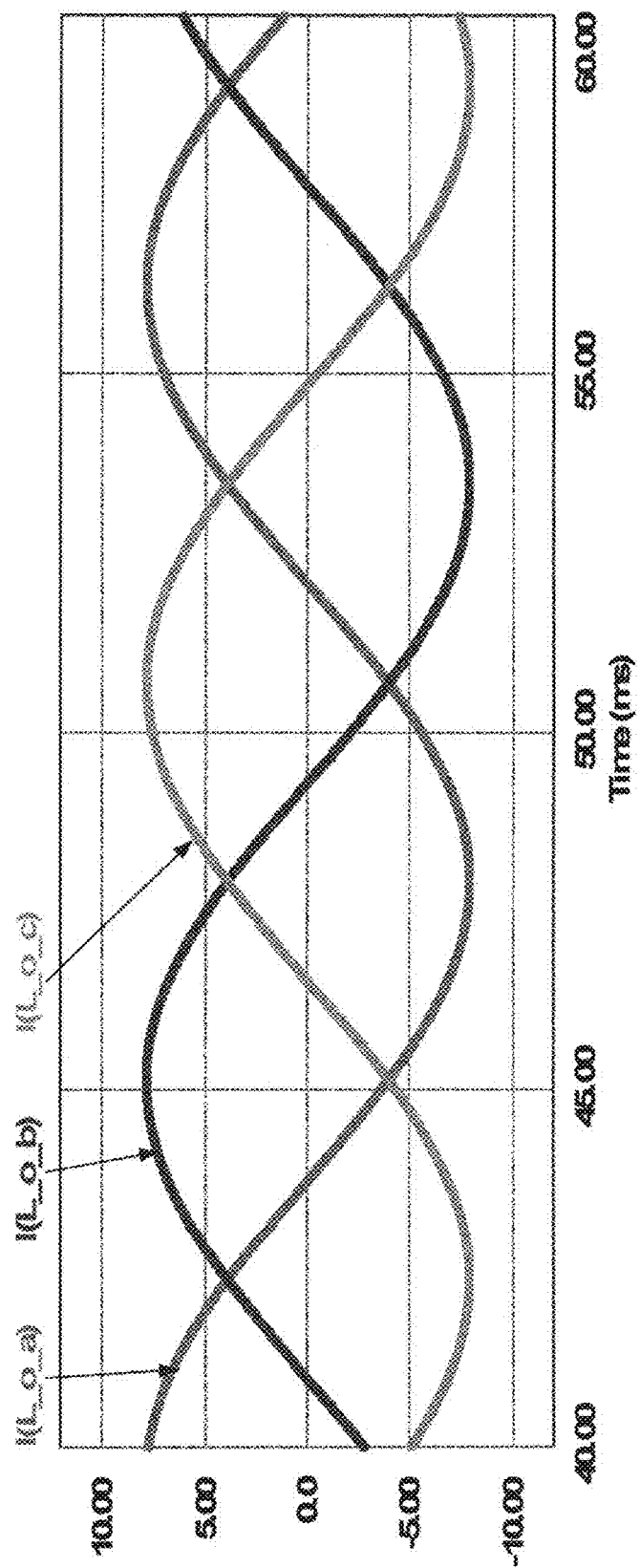
Figure 12:
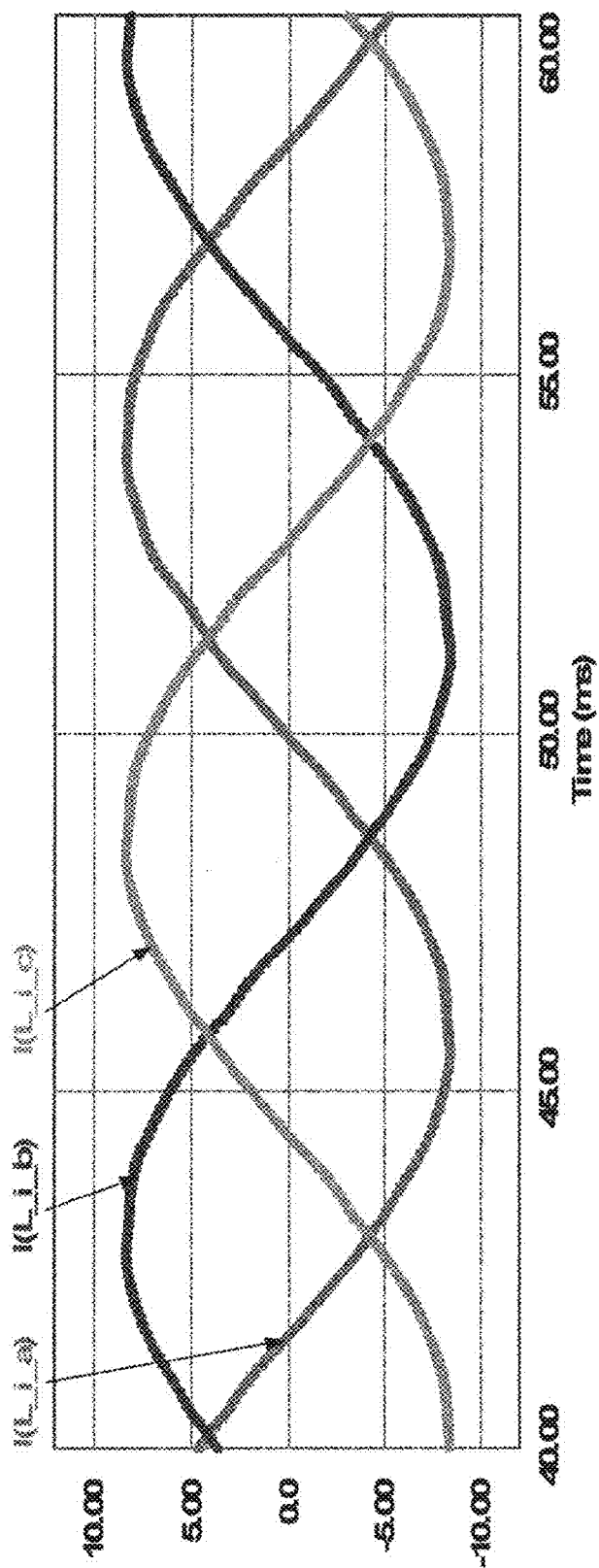
FIGS. 12 and 13 illustrate filtered input and output currents of the ultra-sparse partial resonant converters of FIGS. 8-10 in accordance with the present disclosure.
Figure 13:
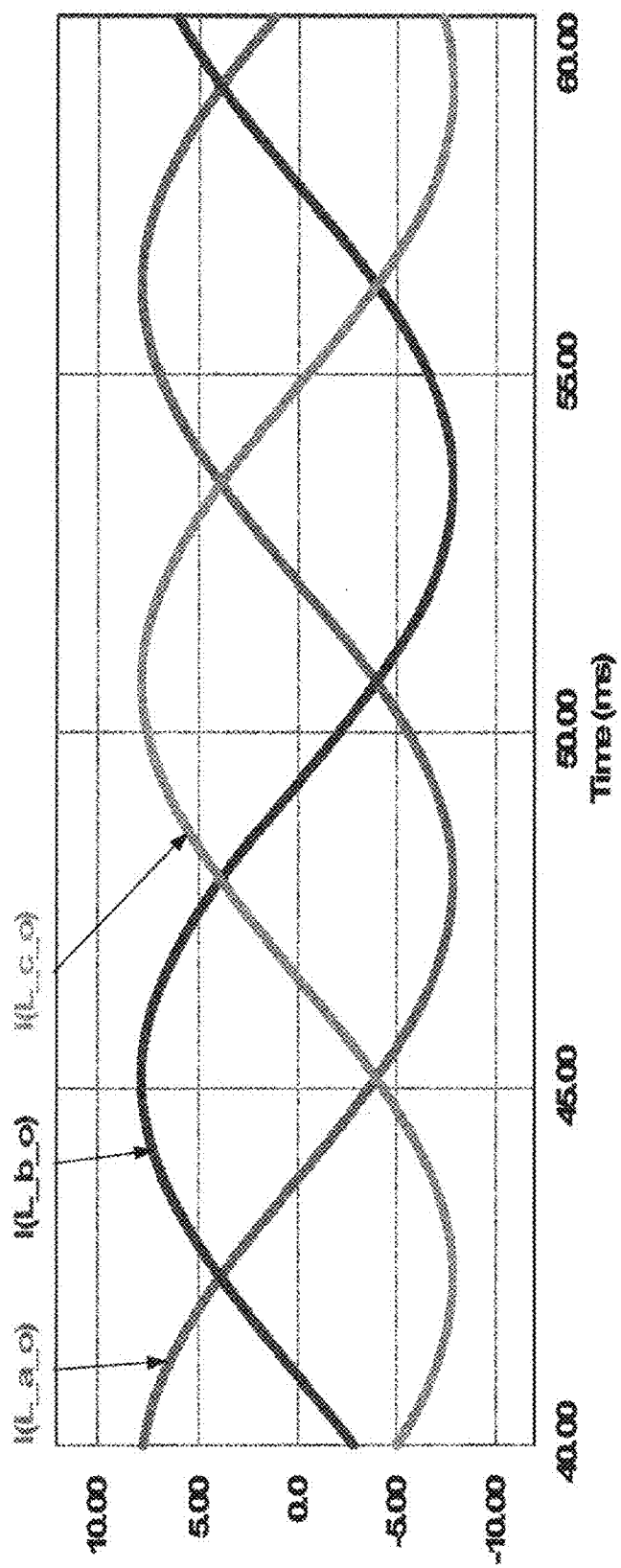
Figure 14:
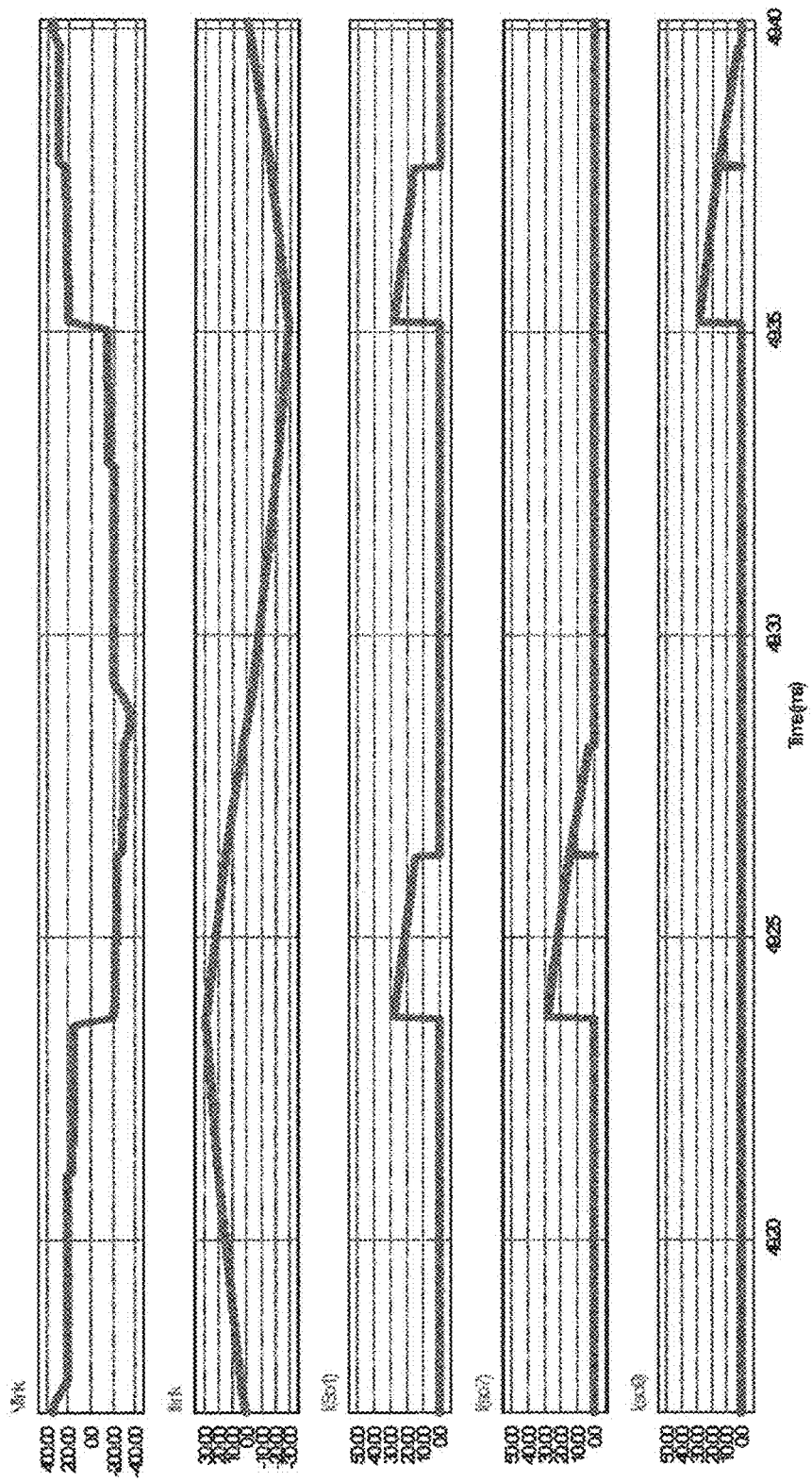
FIG. 14 illustrates link current, link voltage, current passing through So1, current passing through So7 and current passing through So9 in the sparse partial resonant converter of FIG. 7 in accordance with the present disclosure.
Figure 15:
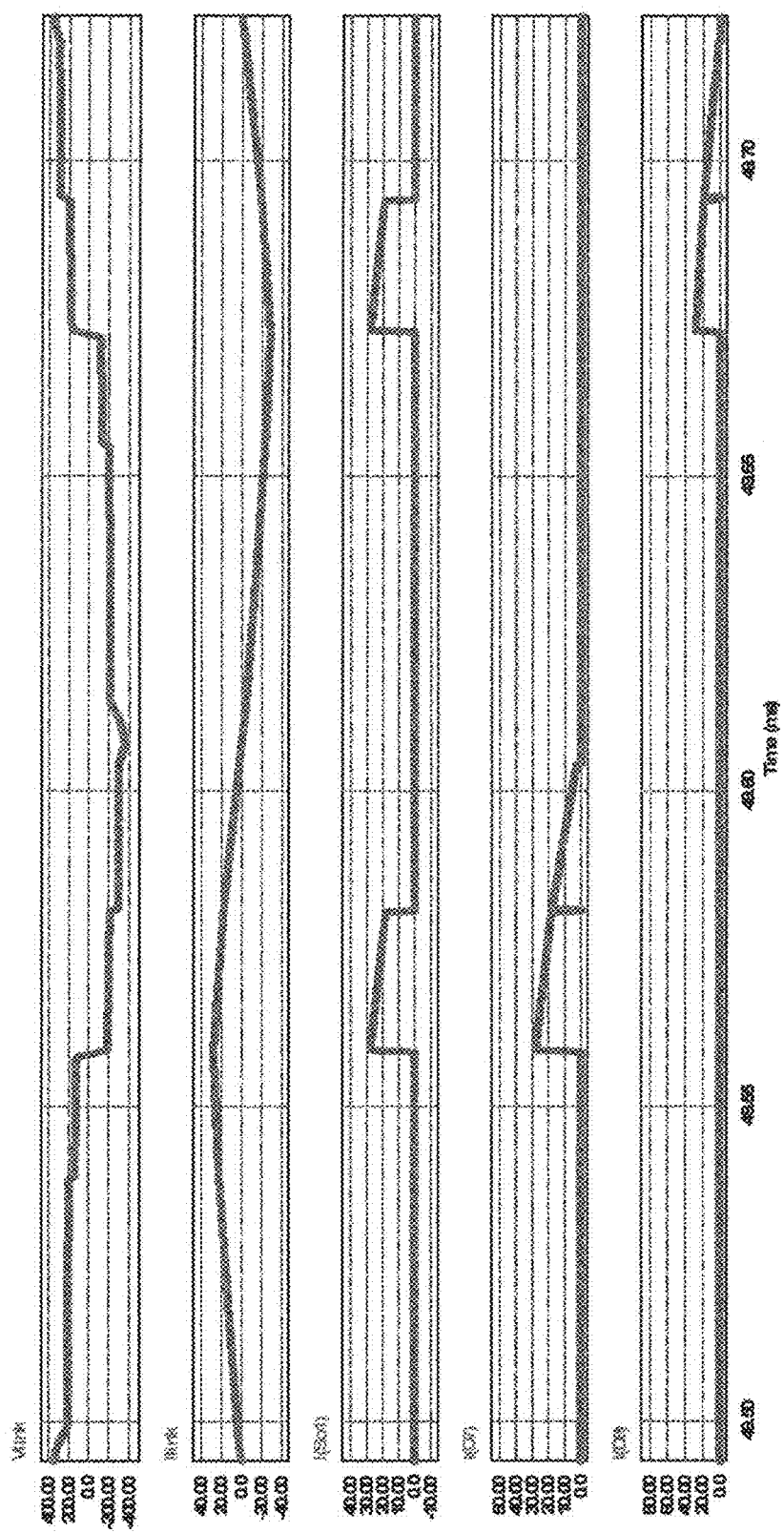
FIG. 15 illustrates link voltage, link current, current passing through So1, current passing through Do7 and current passing through Do9 in the ultra-sparse partial resonant converter of FIG. 8 in accordance with the present disclosure.

As previously described, FIGS. 5 and 6 represent the filtered input and output currents in the partial resonant converter of FIG. 1. The same waveforms for the ultra-sparse partial resonant converter are represented in FIGS. 12 and 13. Link current, link voltage, current passing through So1, current passing through So7 and current passing through So9 in the sparse partial resonant converter are illustrated in FIG. 14. Link voltage, link current, current passing through So1, current passing through Do7 and current passing through Do9 in the ultra-sparse partial resonant converter are illustrated in FIG. 15.

Figure 16:
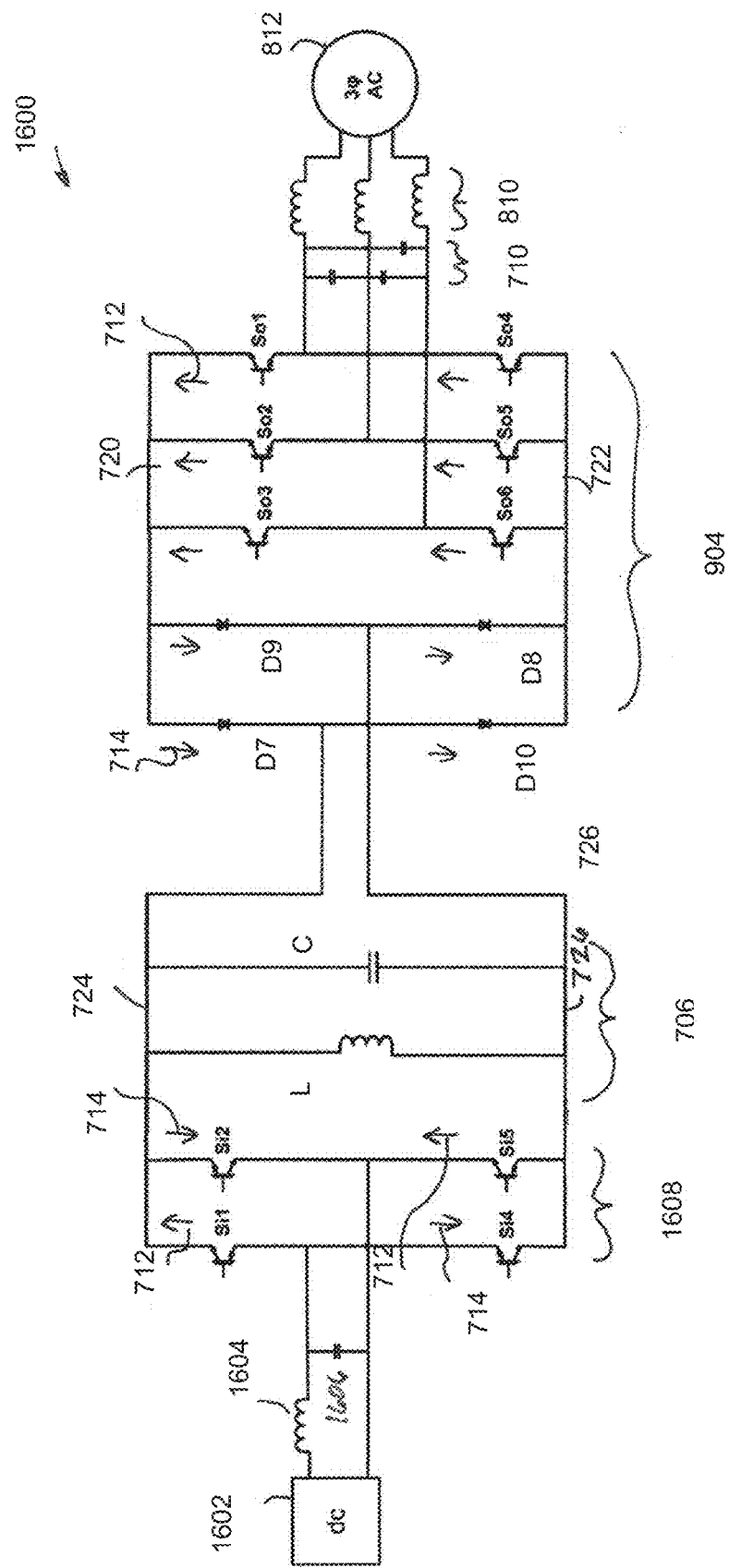
FIG. 16 illustrates a DC-AC partial resonant converter having an output based on the ultra-sparse partial resonant converter in accordance with the present disclosure.

An important feature of the ultra-sparse partial resonant converter is that similar to the original partial resonant converter and the sparse partial resonant converter, it is universal and therefore it can appear as DC-DC, DC-AC and AC-DC as well. For example, the ultra-sparse DC-AC partial resonant converter can be as shown in FIG. 16. The DC side is kept the same as a typical partial resonant converter. Moreover, galvanic isolation can be provided by adding a single-phase high frequency transformer to the link.

The ultra-sparse partial resonant converter 1600 includes a DC input 1602 connected to a first line reactor circuit 1604, a first filter capacitor circuit 1606 connected to the first line reactor circuit 1604, a first switching circuit 1608 connected to the first filter capacitor circuit 1606, a partial resonant link circuit 706 connected to the first switching circuit 1608, a second switching circuit 904 connected to the partial resonant link circuit 706, a second filter capacitor circuit 710 connected to the second switching circuit 904, a second line reactor circuit 810 connected to the second filter capacitor circuit 710, and an output 812 connected to the second line reactor circuit 810. The partial resonant link circuit 706 includes an inductor (L) parallel connected to a capacitor (C). As shown, the first switching circuit 1608 is a DC input switching circuit and the second switching circuit 904 is an AC output switching circuit. The first switching circuit 1608 and the second switching circuit 904 are controlled by a controller, processor or other suitable control circuit or device (not shown). Note that the first line reactor circuit 1604 and the second line reactor circuit 810 are optional.

The first switching circuit 1608 includes two pairs of first forward-conducting-bidirectional-blocking switches (Si1, Si4), (Si2, Si5). One of the first forward-conducting-bidirectional-blocking switches in the first pair (Si1) is series connected between the input and the top port 724 of the partial resonant link circuit 706 in the first direction (arrow 712), and the other first forward-conducting-bidirectional-blocking switch in the first pair (Si4) is series connected between the input and the bottom port 726 of the partial resonant link circuit 706 in the second direction (arrow 714). One of the first forward-conducting-bidirectional-blocking switches in the second pair (Si2) is series connected between the input and the top port 724 of the partial resonant link circuit 706 in the second direction (arrow 714), and the other first forward-conducting-bidirectional-blocking switch in the second pair (Si5) is series connected between the input and the bottom port 726 of the partial resonant link circuit 706 in the first direction (arrow 712). As shown, each first forward-conducting-bidirectional-blocking switch is a reverse blocking IGBT module, but each first forward-conducting-bidirectional-blocking switch can be a forward-conducting-forward-blocking switch (e.g., an IGBT) series coupled with a reverse blocking diode, or other suitable switching device.

The second switching circuit 904 includes three pairs of second forward-conducting-bidirectional-blocking switches (So1, So4), (So2, So5), (So3, So6) connected in the first direction (arrow 712) and two pairs of second forward-conducting-reverse-blocking devices (D9, D8), (D7, D10) connected in the second direction (arrow 714). Each pair of the three pairs of second forward-conducting-bidirectional-blocking switches (e.g., So1, So4) is connected such that one of the second forward-conducting-bidirectional-blocking switches (e.g., So1) is series connected between the second line reactor circuit 810 and a third port 720, and the other second forward-conducting-bidirectional-blocking switch (e.g., So4) is series connected between the second line reactor circuit 810 and a fourth port 722. One pair of the two pairs of second forward-conducting-reverse-blocking devices (D7, D10) is connected such that one of the second forward-conducting-reverse-blocking devices (D7) is connected between the third port 720 and the top port 724 of the partial resonant link circuit 706, and the other second forward-conducting-reverse-blocking device (D10) is series connected between the fourth port 722 and the top port 724 of the partial resonant circuit 706. The other pair of the two pairs of second forward-conducting-reverse-blocking devices (D8, D9) is connected such that one of the second forward-conducting-reverse-blocking devices (D9) is connected between the third port 720 and the bottom port 726 of the partial resonant link circuit 706, and the other second forward-conducting-reverse-blocking device (D8) is series connected between the fourth port 722 and the bottom port 726 of the partial resonant circuit 706. As shown, each second forward-conducting-reverse-blocking device is a reverse blocking diode, but each first forward-conducting-bidirectional-blocking switch or second forward-conducting-bidirectional-blocking switch can be a reverse blocking IGBT module, or other suitable reverse blocking device.

Figure 17:
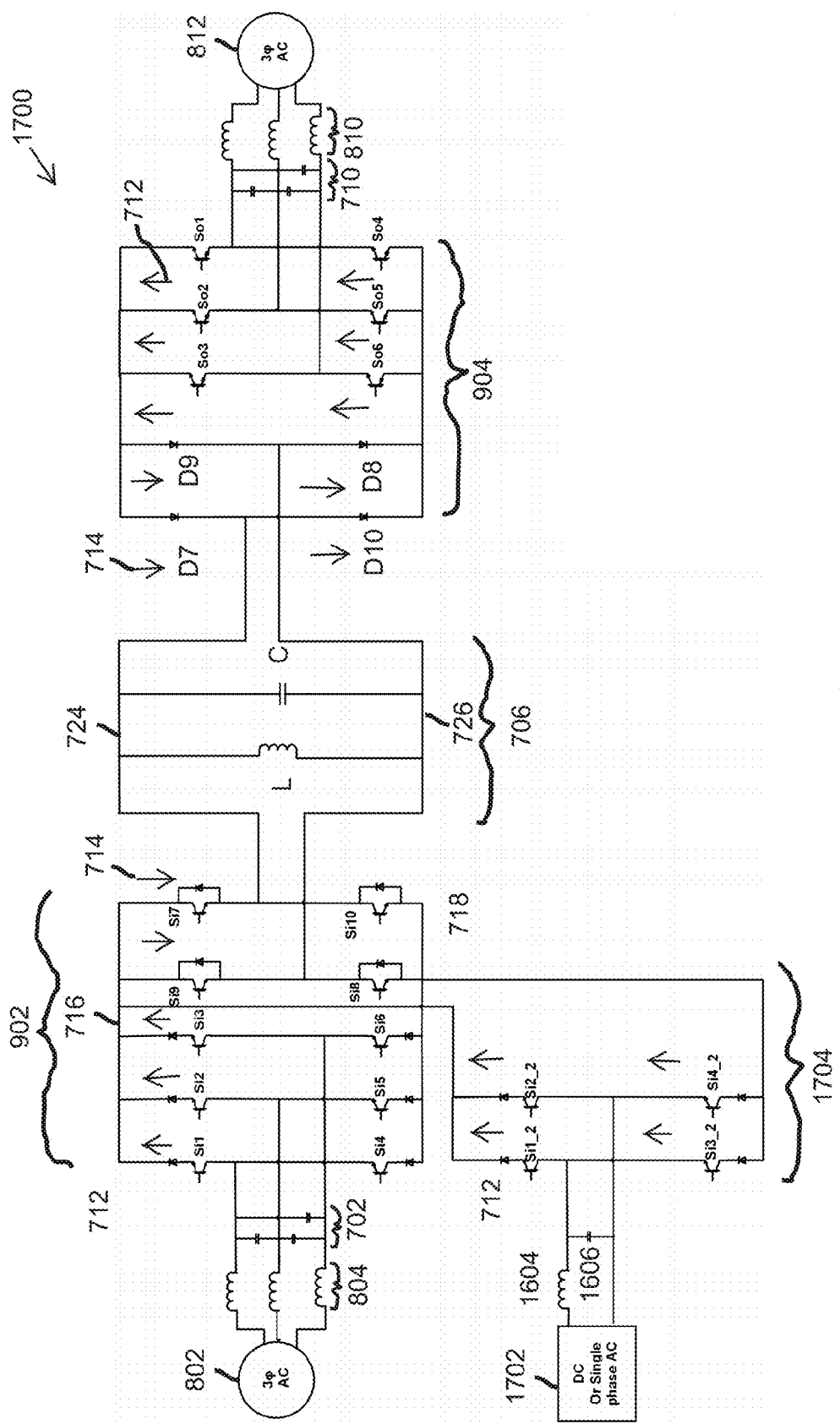
FIG. 17 illustrates a hybrid ultra-sparse resonant converter in accordance with one embodiment of the present disclosure.

The present disclosure also provides for the use of any of the foregoing converter circuits in a hybrid configuration to add any number of additional inputs or outputs to a sparse or ultra-sparse partial resonant converter. For example, FIG. 17 illustrates a hybrid ultra-sparse partial resonant converter 1700 having a first input 802 (e.g., three-phase AC), a second input 1702 (e.g., DC or single-phase AC), and an output 812 (e.g., three-phase AC). The hybrid ultra-sparse partial resonant converter 1700 includes an first input 802 connected to a first line reactor circuit 804, a first filter capacitor circuit 702 connected to the first line reactor circuit 804, a first switching circuit 902 connected to the filter capacitor circuit 702, a partial resonant link circuit 706 connected to the first switching circuit 902, a second switching circuit 904 connected to the partial resonant link circuit 706, a second filter capacitor circuit 710, a second line reactor circuit 810 connected to the second filter capacitor circuit 710, an output 812 connected to the second line reactor circuit 810, a second input 1702 connected to a third line reactor circuit 1604, a third filter capacitor circuit 1606 connected to the third line reactor circuit 1604, a third switching circuit 1704 connected to the third filter capacitor circuit 1606 and the first switching circuit. As shown, the first switching circuit 902 is a three-phase AC input switching circuit, the second switching circuit 904 is a three-phase AC output switching circuit, and the third switching circuit 1704 is a DC or single-phase AC input switching circuit. The first switching circuit 902, second switching circuit 904 and third switching circuit 1704 are controlled by a controller, processor or other suitable control circuit or device (not shown). Note that the first line reactor circuit 804, second line reactor circuit 810 and third line reactor circuit 1604 are optional. Most of these components have been previously described in reference to FIGS. 7-9 and 16.

The third switching circuit 1704 includes two pairs of third forward-conducting-bidirectional-blocking switches (Si1_2, Si3_2), (Si2_2, Si4_2) connected in the first direction (arrow 712). Each pair of the two pairs of third forward-conducting-bidirectional-blocking switches (e.g., Si1_2, Si3_2) is connected such that one of the third forward-conducting-bidirectional-blocking switches (e.g., Si1_2) is series connected between the third line reactor circuit 1604 and the first port 716, and the other third forward-conducting-bidirectional-blocking switch (e.g., Si3_2) is series connected between the third line reactor circuit 1604 and the second port 718. As shown, each first forward-conducting-bidirectional-blocking switch is a switch series coupled with a reverse blocking diode, but each first forward-conducting-bidirectional-blocking switch can be a reverse blocking IGBT module, or other suitable switching device.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or rives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An input or output switching circuit for a power converter comprising:
    two or more pairs of forward-conducting-bidirectional-blocking switches connected in a first direction;
    two pairs of forward-conducting-bidirectional-blocking devices connected in a second direction to the two or more pairs of forward-conducting-bidirectional-blocking switches whenever the input or output switching circuit is a sparse input or output switching circuit;
    two pairs of forward-conducting-forward-blocking devices connected in the second direction to the two or more pairs of forward-conducting-bidirectional-blocking switches whenever the input or output switching circuit is an ultra-sparse input switching circuit;
    two pairs of forward-conducting-reverse-blocking devices connected in the second direction to the two or more pairs of forward-conducting-bidirectional-blocking switches, whenever the input or output switching circuit is an ultra-sparse output switching circuit; and
    wherein the second direction is opposite to the first direction.

2. The switching circuit as recited in claim 1, wherein the two or more pairs of forward-conducting-bidirectional-blocking switches comprise two pairs of forward-conducting-bidirectional-blocking switches whenever the input or output switching circuit is a DC input or output switching circuit or a single-phase AC input or output switching circuit.

3. The switching circuit as recited in claim 1, wherein the two or more pairs of forward-conducting-bidirectional-blocking switches comprise three or more pairs of forward-conducting-bidirectional-blocking switches whenever the input or output switching circuit is a three or more phase AC input or output switching circuit.

4. The switching circuit as recited in claim 1, wherein each forward-conducting-bidirectional-blocking switch comprises a switch coupled with a reverse blocking diode, or a reverse blocking insulated-gate bipolar transistor (IGBT) module.

5. The switching circuit as recited in claim 1, wherein:
    each forward-conducting-forward-blocking device comprises a switch or an insulated-gate bipolar transistor (IGBT); and
    each forward-conducting-reverse-blocking device comprises a diode.

6. An input or output sparse switching circuit for a power converter comprising:
    two or more pairs of forward-conducting-bidirectional-blocking switches connected in a first direction; and
    two pairs of forward-conducting-bidirectional-blocking devices connected in a second direction to the two or more pairs of forward-conducting-bidirectional-blocking switches, wherein the second direction is opposite to the first direction.

7. The switching circuit as recited in claim 6, wherein the two or more pairs of forward-conducting-bidirectional-blocking switches comprise two pairs of forward-conducting-bidirectional-blocking switches whenever the sparse input or output switching circuit is a DC input or output sparse switching circuit or a single-phase AC input or output sparse switching circuit.

8. The switching circuit as recited in claim 6, wherein the two or more pairs of forward-conducting-bidirectional-blocking switches comprise three or more pairs of forward-conducting-bidirectional-blocking switches whenever the input or output sparse switching circuit is a three or more phase AC input or output sparse switching circuit.

9. The switching circuit as recited in claim 6, wherein each forward-conducting-bidirectional-blocking switch and each forward-conducting-bidirectional-blocking device comprises a switch coupled with a reverse blocking diode, or a reverse blocking insulated-gate bipolar transistor (IGBT) module.

10. An input or output ultra-sparse switching circuit for a power converter comprising:
    two or more pairs of forward-conducting-bidirectional-blocking switches connected in a first direction;
    two pairs of forward-conducting-forward-blocking devices connected in a second direction to the two or more pairs of forward-conducting-bidirectional-blocking switches whenever the input or output switching circuit is an ultra-sparse input switching circuit;
    two pairs of forward-conducting-reverse-blocking devices connected in the second direction to the two or more pairs of forward-conducting-bidirectional-blocking switches, whenever the input or output switching circuit is an ultra-sparse output switching circuit; and
    wherein the second direction is opposite to the first direction.

11. The switching circuit as recited in claim 10, wherein the two or more pairs of forward-conducting-bidirectional-blocking switches comprise two pairs of forward-conducting-bidirectional-blocking switches whenever the input or output ultra-sparse switching circuit is a DC input or output ultra-sparse switching circuit or a single-phase AC input or output ultra-sparse switching circuit.

12. The switching circuit as recited in claim 10 wherein the two or more pairs of forward-conducting-bidirectionalblocking switches comprise three or more pairs of forward-conducting-bidirectional-blocking switches whenever the input or output ultra-sparse switching circuit is a three or more phase AC input or output ultra-sparse switching circuit.

13. The switching circuit as recited in claim 10, wherein each forward-conducting-bidirectional-blocking switch comprises a switch coupled with a reverse blocking diode, or a reverse blocking insulated-gate bipolar transistor (IGBT) module.

14. The switching circuit as recited in claim 10, wherein:
each forward-conducting-forward-blocking device comprises a switch or an insulated-gate bipolar transistor (IGBT); and
each forward-conducting-reverse-blocking device comprises a diode.

15. A sparse partial resonant converter comprising:
a first switching circuit comprising at least two pairs of first forward-conducting-bidirectional-blocking switches connected in a first direction and two pairs of first forward-conducting-bidirectional-blocking devices connected in a second direction to the at least two pairs of first forward-conducting-bidirectional-blocking switches, wherein the second direction is opposite to the first direction;
a second switching circuit comprising at least two pairs of second forward-conducting-bidirectional-blocking switches connected in the first direction and two pairs of second forward-conducting-bidirectional-blocking devices connected in the second direction to the at least two pairs of second forward-conducting-bidirectional-blocking switches; and
a partial resonant link circuit connected between the first switching circuit and the second switching circuit.

16. The sparse partial resonant converter as recited in claim 15, wherein:
the first switching circuit comprises a DC input or output sparse switching circuit or a single-phase AC input or output sparse switching circuit; and
the at least two pairs of first forward-conducting-bidirectional-blocking switches comprise two pairs of first forward-conducting-bidirectional-blocking switches.

17. The sparse partial resonant converter as recited in claim 15, wherein:
the second switching circuit comprises a DC input or output sparse switching circuit or a single-phase AC input or output sparse switching circuit; and
the at least two pairs of second forward-conducting-bidirectional-blocking switches comprise two pairs of second forward-conducting-bidirectional-blocking switches.

18. The sparse partial resonant converter as recited in claim 15, wherein:
the first switching circuit comprises a three or more phase AC input or output sparse switching circuit; and
the two or more pairs of first forward-conducting-bidirectional-blocking switches comprise three or more pairs of first forward-conducting-bidirectional-blocking switches.

19. The sparse partial resonant converter as recited in claim 15, wherein:
the second switching circuit comprises a three or more phase AC input or output sparse switching circuit; and
the two or more pairs of second forward-conducting-bidirectional-blocking switches comprise three or more pairs of second forward-conducting-bidirectional-blocking switches.

20. The sparse partial resonant converter as recited in claim 15, wherein each first forward-conducting-bidirectional-blocking switch, each first forward-conducting-bidirectional-blocking device, each second forward-conducting-bidirectional-blocking switch, and each second forward-conducting-bidirectional-blocking device comprises a switch coupled with a reverse blocking diode, or a reverse blocking insulated-gate bipolar transistor (IGBT) module.

21. The sparse partial resonant converter as recited in claim 15, wherein:
each pair of the at least two pairs of first forward-conducting-bidirectional-blocking switches is connected such that one of the first forward-conducting-bidirectional-blocking switches is series connected between an input or output and a first port, and the other first forward-conducting-bidirectional-blocking switch is series connected between the input or output and a second port;
a first pair of the two pairs of first forward-conducting-bidirectional-blocking devices is connected such that one of the first forward-conducting-bidirectional-blocking devices is connected between the first port and a top port of the partial resonant link circuit, and the other first forward-conducting-bidirectional-blocking device is series connected between the second port and the top port of the partial resonant circuit; and
a second pair of the two pairs of first forward-conducting-bidirectional-blocking devices is connected such that one of the first forward-conducting-bidirectional-blocking devices is connected between the first port and a bottom port of the partial resonant link circuit, and the other first forward-conducting-bidirectional-blocking device is series connected between the second port and the bottom port of the partial resonant circuit.

22. The sparse partial resonant converter as recited in claim 15, wherein:
each pair of the at least two pairs of second forward-conducting-bidirectional-blocking switches is connected such that one of the second forward-conducting-bidirectional-blocking switches is series connected between an input or output and a third port, and the other second forward-conducting-bidirectional-blocking switch is series connected between the input or output and a fourth port;
a first pair of the two pairs second forward-conducting-bidirectional-blocking devices is connected such that one of the second forward-conducting-bidirectional-blocking devices is connected between the third port and a top port of the partial resonant link circuit, and the other second forward-conducting-reverse-blocking device is series connected between the fourth port and the top port of the partial resonant circuit; and
a second pair of the two pairs second forward-conducting-bidirectional-blocking devices is connected such that one of the second forward-conducting-bidirectional-blocking devices is connected between the third port and a bottom port of the partial resonant link circuit, and the other second forward-conducting-reverse-blocking device is series connected between the fourth port and the bottom port of the partial resonant circuit.

23. The sparse partial resonant converter as recited in claim 15, wherein the link circuit comprises an inductor, or a single-phase transformer, or the inductor parallel connected to a capacitor, or the single-phase transformer parallel connected to the capacitor.

24. The sparse partial resonant converter as recited in claim 15, further comprising a filter capacitor circuit connected to the first switching circuit or the second switching circuit.

25. The sparse partial resonant converter as recited in claim 24, further comprising a line reactor circuit connected to the filter capacitor circuit.

26. The sparse partial resonant converter as recited in claim 15, further comprising a controller connected to the first switching circuit and the second switching circuit.

27. The sparse partial resonant converter as recited in claim 15, further comprising a third switching circuit connected to the first switching circuit or the second switching circuit, the third switching circuit comprising at least two pairs of third forward-conducting-bidirectional-blocking switches connected in the first direction.

28. The sparse partial resonant converter as recited in claim 27, wherein each pair of the at least two pairs of third forward-conducting-bidirectional-blocking switches is connected such that one of the third forward-conducting-bidirectional-blocking switches is series connected between either a second input and a first port or a second output and a third port, and the other third forward-conducting-bidirectional-blocking switch is series connected between either the second input and a second port or the second output and a fourth port.

29. An ultra-sparse partial resonant converter comprising:
a first switching circuit comprising two or more pairs of first forward-conducting-bidirectional-blocking switches connected in a first direction, and either two pairs of first forward-conducting-forward-blocking devices connected in a second direction to the two or more pairs of first forward-conducting-bidirectional-blocking switches whenever the first switching circuit is an input switching circuit or two pairs of first forward-conducting-reverse-blocking devices connected in the second direction to the two or more pairs of first forward-conducting-bidirectional-blocking switches whenever the first switching circuit is an output switching circuit;
a second switching circuit comprising two or more pairs of second forward-conducting-bidirectional-blocking switches connected in the first direction, and either two pairs of second forward-conducting-forward-blocking devices connected in the second direction to the two or more pairs of second forward-conducting-bidirectional-blocking switches whenever the second switching circuit is the input switching circuit or two pairs of second forward-conducting-reverse-blocking devices connected in the second direction to the two or more pairs of second forward-conducting-bidirectional-blocking switches whenever the second switching circuit is the output switching circuit;
the second direction is opposite to the first direction; and
a partial resonant link circuit connected between the first switching circuit and the second switching circuit.

30. The ultra-sparse partial resonant converter as recited in claim 29, wherein:
the first switching circuit comprises a DC input or output ultra-sparse switching circuit or a single-phase AC input or output ultra-sparse switching circuit; and
the two or more pairs of first forward-conducting-bidirectional-blocking switches comprise two pairs of first forward-conducting-bidirectional-blocking switches.

31. The ultra-sparse partial resonant converter as recited in claim 29, wherein:
the second switching circuit comprises a DC input or output ultra-sparse switching circuit or a single-phase AC input or output ultra-sparse switching circuit; and
the two or more pairs of second forward-conducting-bidirectional-blocking switches comprise two pairs of second forward-conducting-bidirectional-blocking switches.

32. The ultra-sparse partial resonant converter as recited in claim 29, wherein:
the first switching circuit comprises a three or more phase AC input or output ultra-sparse switching circuit; and
the two or more pairs of first forward-conducting-bidirectional-blocking switches comprise three or more pairs of first forward-conducting-bidirectional-blocking switches.

33. The ultra-sparse partial resonant converter as recited in claim 29, wherein:
the second switching circuit comprises a three or more phase AC input or output ultra-sparse switching circuit; and
the two or more pairs of second forward-conducting-bidirectional-blocking switches comprise three or more pairs of second forward-conducting-bidirectional-blocking switches.

34. The ultra-sparse partial resonant converter as recited in claim 29, wherein each first forward-conducting-bidirectional-blocking switch and each second forward-conducting-bidirectional-blocking switch comprises a switch coupled with a reverse blocking diode, or a reverse blocking insulated-gate bipolar transistor (IGBT) module.

35. The ultra-sparse partial resonant converter as recited in claim 29, wherein:
each first forward-conducting-forward-blocking device and each second forward-conducting-forward-blocking device comprises a switch or an insulated-gate bipolar transistor (IGBT); and
each first forward-conducting-reverse-blocking device and each second forward-conducting-reverse-blocking device comprises a diode.

36. The ultra-sparse partial resonant converter as recited in claim 29, wherein:
each pair of the two or more pairs of first forward-conducting-bidirectional-blocking switches is connected such that one of the first forward-conducting-bidirectional-blocking switches is series connected between an input or output and a first port, and the other first forward-conducting-bidirectional-blocking switch is series connected between the input or output and a second port;
a first pair of the two pairs of first forward-conducting-forward-blocking devices or first forward-conducting-reverse-blocking devices is connected such that one of the first forwardconducting-forward-blocking devices or first forward-conducting-reverse-blocking devices is connected between the first port and a top port of the partial resonant link circuit, and the other first forward-conducting-forward-blocking device or first forward-conducting-reverse-blocking devices is series connected between the second port and the top port of the partial resonant circuit; and
a second pair of the two pairs of first forward-conducting-forward-blocking devices or first forward-conducting-reverse-blocking devices is connected such that one of the first forward-conducting-forward-blocking devices or first forward-conducting-reverse-blocking devices is connected between the first port and a bottom port of the partial resonant link circuit, and the other first forward-conducting-forward-blocking device or first forward-conducting-reverse- blocking devices is series connected between the second port and the bottom port of the partial resonant circuit.

37. The ultra-sparse partial resonant converter as recited in claim 29, wherein:
  each pair of the two or more pairs of second forward-conducting-forward-blocking switches is connected such that one of the second forward-conducting-forward-blocking switches is series connected between an input or output and a third port, and the other second forward-conducting-forward-blocking switch is series connected between the input or output and a fourth port;
  a first pair of the two pairs second forward-conducting-forward-blocking devices or second forward-conducting-reverse-blocking devices is connected such that one of the second forward-conducting-forward-blocking devices or second forward-conducting-reverse-blocking devices is connected between the third port and a top port of the partial resonant link circuit, and the other second forward-conducting-forward-blocking device or second forward-conducting-reverse-blocking devices is series connected between the fourth port and the top port of the partial resonant circuit; and
  a second pair of the two pairs second forward-conducting-forward-blocking devices or second forward-conducting-reverse-blocking devices is connected such that one of the second forward-conducting-forward-blocking devices or second forward-conducting-reverse-blocking devices is connected between the third port and a bottom port of the partial resonant link circuit, and the other second forward-conducting-forward-blocking device or second forward-conducting-reverse-blocking devices is series connected between the fourth port and the bottom port of the partial resonant circuit.

38. The ultra-sparse partial resonant converter as recited in claim 29, wherein the link circuit comprises an inductor, or a single-phase transformer, or the inductor parallel connected to a capacitor, or the single-phase transformer parallel connected to the capacitor.

39. The ultra-sparse partial resonant converter as recited in claim 29, further comprising a filter capacitor circuit connected to the first switching circuit or the second switching circuit.

40. The ultra-sparse partial resonant converter as recited in claim 39, further comprising a line reactor circuit connected to the filter capacitor circuit.

41. The ultra-sparse partial resonant converter as recited in claim 29, further comprising a controller connected to the first switching circuit and the second switching circuit.

42. The ultra-sparse partial resonant converter as recited in claim 29, further comprising a third switching circuit connected to the first switching circuit or the second switching circuit, the third switching circuit comprising at least two pairs of third forward-conducting-bidirectional-blocking switches connected in the first direction.

43. The ultra-sparse partial resonant converter as recited in claim 42, wherein each pair of the at least two pairs of third forward-conducting-bidirectional-blocking switches is connected such that one of the third forward-conducting-bidirectional-blocking switches is series connected between either a second input and a first port or a second output and a third port, and the other third forward-conducting-bidirectional-blocking switch is series connected between either the second input and a second port or the second output and a fourth port.

* * * * *